(12) United States Patent
Kelty

(10) Patent No.: US 7,309,443 B2
(45) Date of Patent: *Dec. 18, 2007

(54) SKIMMER AND FILTER

(76) Inventor: Charles F. Kelty, 4B Water Garden Way, Santa Fe, NM (US) 87508

(*) Notice: Subject to any disclaimer, the term of this patent is extended or adjusted under 35 U.S.C. 154(b) by 0 days.

This patent is subject to a terminal disclaimer.

(21) Appl. No.: 11/330,439

(22) Filed: Jan. 12, 2006

(65) Prior Publication Data

US 2006/0163132 A1    Jul. 27, 2006

Related U.S. Application Data

(63) Continuation-in-part of application No. 11/176,165, filed on Jul. 6, 2005, and a continuation-in-part of application No. 10/748,973, filed on Dec. 29, 2003, now Pat. No. 7,052,612, said application No. 11/176,165 is a continuation-in-part of application No. 10/748,973.

(60) Provisional application No. 60/586,109, filed on Jul. 6, 2004, provisional application No. 60/436,758, filed on Dec. 27, 2002.

(51) Int. Cl.
E04H 4/12    (2006.01)
C02F 1/32    (2006.01)

(52) U.S. Cl. .................. 210/748; 210/776; 210/167.1; 210/416.2; 210/448

(58) Field of Classification Search .............. 210/744, 210/748, 776, 97, 167.1, 416.1, 416.2, 448, 210/452; 4/507

See application file for complete search history.

(56) References Cited

U.S. PATENT DOCUMENTS

| | | | |
|---|---|---|---|
| 1,762,314 A | 6/1930 | Sutphen | |
| 2,103,316 A | 12/1937 | Boosey | |
| 2,282,225 A | 5/1942 | Hawley | |
| 3,059,243 A | 10/1962 | Ross | |
| 3,661,262 A | 5/1972 | Sanders | |
| 3,677,408 A | 7/1972 | Dinizo, Jr. | |
| 3,744,637 A | 7/1973 | Ziegler | |
| 3,749,244 A * | 7/1973 | Jannuzzi, Jr. | 210/167.11 |
| 3,765,534 A * | 10/1973 | West et al. | 210/167.11 |
| 3,907,672 A | 9/1975 | Milne | |
| 4,021,347 A | 5/1977 | Teller et al. | |
| 4,022,690 A | 5/1977 | Smith | |
| 4,139,471 A | 2/1979 | Foti | |
| 4,246,113 A | 1/1981 | Mausgrover | |
| 4,454,035 A | 6/1984 | Gunter | |
| 4,752,401 A | 6/1988 | Bodenstein | |
| 5,234,588 A * | 8/1993 | Aymes | 210/202 |
| 5,256,299 A | 10/1993 | Wang | |
| 5,285,538 A | 2/1994 | Hodak | |
| 5,759,415 A | 6/1998 | Adams | |
| 5,780,860 A | 7/1998 | Gadgil et al. | |
| 5,785,845 A | 7/1998 | Colaiano | |
| 6,322,694 B1 | 11/2001 | Iliadis et al. | |
| 6,461,501 B1 | 10/2002 | Porter | |
| 6,511,605 B2 * | 1/2003 | Connelly, Jr. | 210/749 |
| 2002/0139757 A1 * | 10/2002 | Connelly, Jr. | 210/749 |
| 2003/0094422 A1 | 5/2003 | Perkins et al. | |
| 2004/0094470 A1 | 5/2004 | Jackson | |
| 2006/0163132 A1 | 7/2006 | Kelty | |

* cited by examiner

FOREIGN PATENT DOCUMENTS

DE    29816019    1/2000
GB    2353231    2/2001

*Primary Examiner*—Fred G. Prince
(74) *Attorney, Agent, or Firm*—Vidal A. Oaxaca; Peacock Myers, P.C.

(57) ABSTRACT

The present invention provides a skimmer and filter unit for use with a body of water. The unit comprises a housing, a basket for collecting debris, and a partitioning baffle with upper openings and optionally lower openings, and a microorganism eradication system within the housing. The baffle's lower opening is preferably positioned below the rim of the perforated basket and its upper, screened or gated opening is positioned above the rim of the basket for allowing water to pass in the event of debris clogging the first opening, overflow conditions, larger flow demand, and/or filter demand.

26 Claims, 23 Drawing Sheets

SKIMMER AND FILTER

CROSS-REFERENCE TO RELATED APPLICATIONS

This application is a continuation-in-part of, and claims priority to: 10/748,973 now U.S. Pat. No. 7,052,612, filed Dec. 29, 2003, titled "Skimmer and Filter", which claims priority to U.S. Provisional Patent Application Ser. No. 60/436,758, titled "Method and Apparatus for Pond Skimmer and Filter, filed on Dec. 27, 2002; and U.S. patent application Ser. No. 11/176,165, filed Jul. 6, 2005, titled "Water Skimmer", which itself is a continuation-in-part application of U.S. patent application Ser. No. 10/748,973, and which is also related to U.S. Provisional Patent Application Ser. No. 60/586,109 filed Jul. 6, 2004, titled "Water Skimmer". This application is also related to PCT Application No. US05/24129 titled "Water Skimmer", filed Jul. 6, 2005. The specifications and claims of all said applications are incorporated herein by reference.

BACKGROUND OF THE INVENTION

1. Field of the Invention (Technical Field)

The present invention relates generally to devices such as filters, skimmers, and other water treatment devices for the removal of debris and other undesirable materials from bodies of water such as pools, ponds, waterfalls and streams.

2. Description of Related Art

Skimmers and filters are often used in conjunction to clean and treat decorative bodies of water for landscaping, such as ponds and waterfalls. In general, skimmers skim debris from the surface of the water and filters remove smaller debris or particulate matter from the entire depth of the water. Skimmers typically filter larger debris from the water surface with a coarse net or basket, while filters incorporate filter media, which can be a variety of materials including but not limited to mats, rocks, and nylon mesh, all of which have limited capacity for water treatment. Often one or more pumps are used to draw the water to the mouth of the skimmer or filter. Once the water has been skimmed or filtered, i.e., processed, it is returned from the skimmer or filter to the body of water.

Skimmers and filters are usually installed external to the body of water but in proximity to it as shown in FIG. 19. For example, many skimmers and filters are installed in the ground adjacent the body of water. These devices are cumbersome and require careful installation to eliminate or reduce water loss during the transfer of water between the body of water and the water treatment device. Another difficulty with filters, skimmers, and water treatment devices is that the mouth, or weir, size is fixed, requiring the user to select a skimmer or filter of a particular size for a given application. Yet another difficulty with skimmers and filters is their inadequacy in reducing or eliminating living organisms, such as single-celled algae, protozoa, and bacteria.

Often, various passageways in filter/skimmer configurations can easily become clogged by leaves which have fallen into the water and accumulate in the filter/skimmer. This is particularly troublesome when dealing with filter/skimmer configurations having only one passageway from a first coarse filter to a finer second filter.

BRIEF SUMMARY OF THE INVENTION

The present invention provides an enhanced surface water skimming and filtering apparatus and method for debris removal from bodies of water, particularly ornamental bodies of water. The water skimmer preferably comprises a housing located near the pond and an opening for receiving water from the pond.

Thus, an embodiment of the present invention comprises a surface skimmer and filter unit for use with a body of water comprising a housing, a water intake flow structure comprising an opening for receiving water from the body of water, a collection basket within the housing, and a microorganism eradication system within the housing. The unit preferably comprises a filter within the housing for removing contaminants from water received in the housing, and the filter is preferably disposed in a filter chamber within the housing.

The housing preferably comprises a generally upright tank. The water flow intake structure preferably comprises a neck, and the neck preferably extends from the housing. The neck preferably comprises a weir faceplate assembly, and the faceplate assembly is preferably of variably adjustable dimensions. The microorganism eradication system may comprise, but is not limited to, a UV light system or UV system in combination with another microorganism eradication system. The unit may comprise a pump within the housing. The unit may further comprise an interlocking lid mating to the housing for reducing deformation of the housing.

The unit may further comprise a baffle partitioning the skimmer chamber from a remainder area within the housing, said baffle comprising a midpoint at approximately halfway along its height and at least one upper opening in the baffle disposed above said midpoint of the baffle for allowing water to pass from the skimmer chamber to the remainder area.

Another embodiment of the present invention provides a method of treating water from a body of water, the method comprising providing a housing comprising an opening at an upper portion of the skimmer, skimming water received through the opening with a skimmer collection basket located downstream and approximately beneath the opening, and directing skimmed water to a microorganism eradication system within the housing to subject the water to the microorganism eradication system for treatment. The microorganism eradication system may comprise, but is not limited to, a UV light system. The method may further comprise directing the water through a filter chamber.

An object of the present invention is to skim debris from the surface of a body of water and to filter and remove smaller debris or particulate matter from the entire depth of the body of water.

An advantage of the present invention is that a microorganism eradication system in integrated into the unit housing for effective destruction or deactivation of microorganisms.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 13b is a perspective view of the tank and interlocking lid of FIG. 13a;

FIG. 20b is a side view of FIG. 20a; and

DETAILED DESCRIPTION OF THE INVENTION

The present invention provides a water skimmer and filter unit. The embodiments shown in the figures are not limiting of the present invention, but are illustrative of the inventive principles.

As used in the specification and claims herein, the words "a", "an", and "the" mean one or more. A skimmer "weir" or "weir door" is defined as a flap or door located in an opening of a surface skimmer through which water enters into the skimmer and filter unit, and "weir opening" is defined as the opening where such a flap may, but is not necessarily, located.

Figure 19:
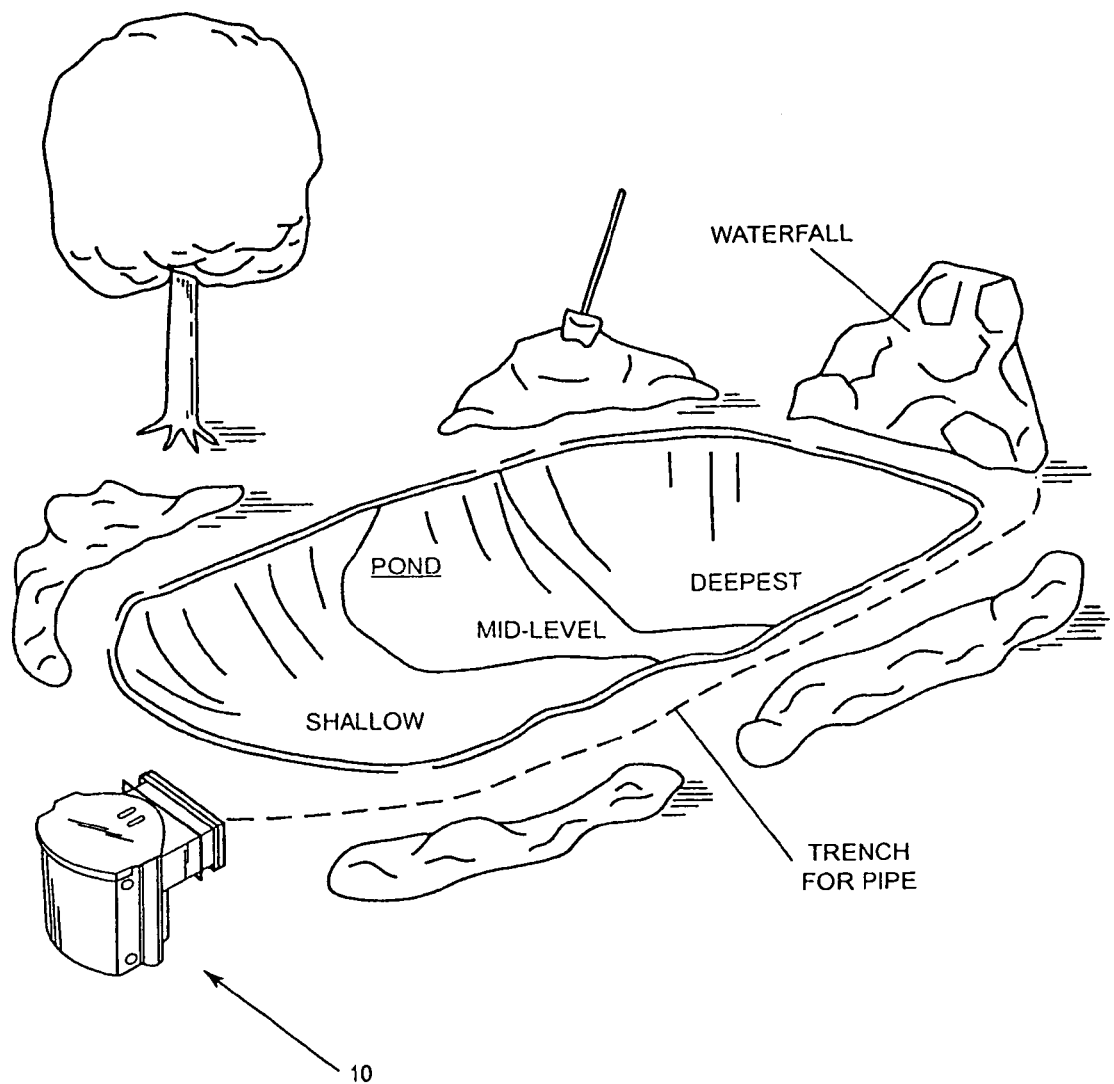
FIG. 19 is a diagrammatic sketch of a decorative pond and a skimmer and filter unit.

A typical application of the present invention is shown in FIG. 19. Shown are a body of water (e.g., a pond) and the skimmer and filter unit of the invention. The installation may also include a waterfall. The skimmer and filter unit is preferably, but not necessarily, installed adjacent to the pond.

Figure 1:
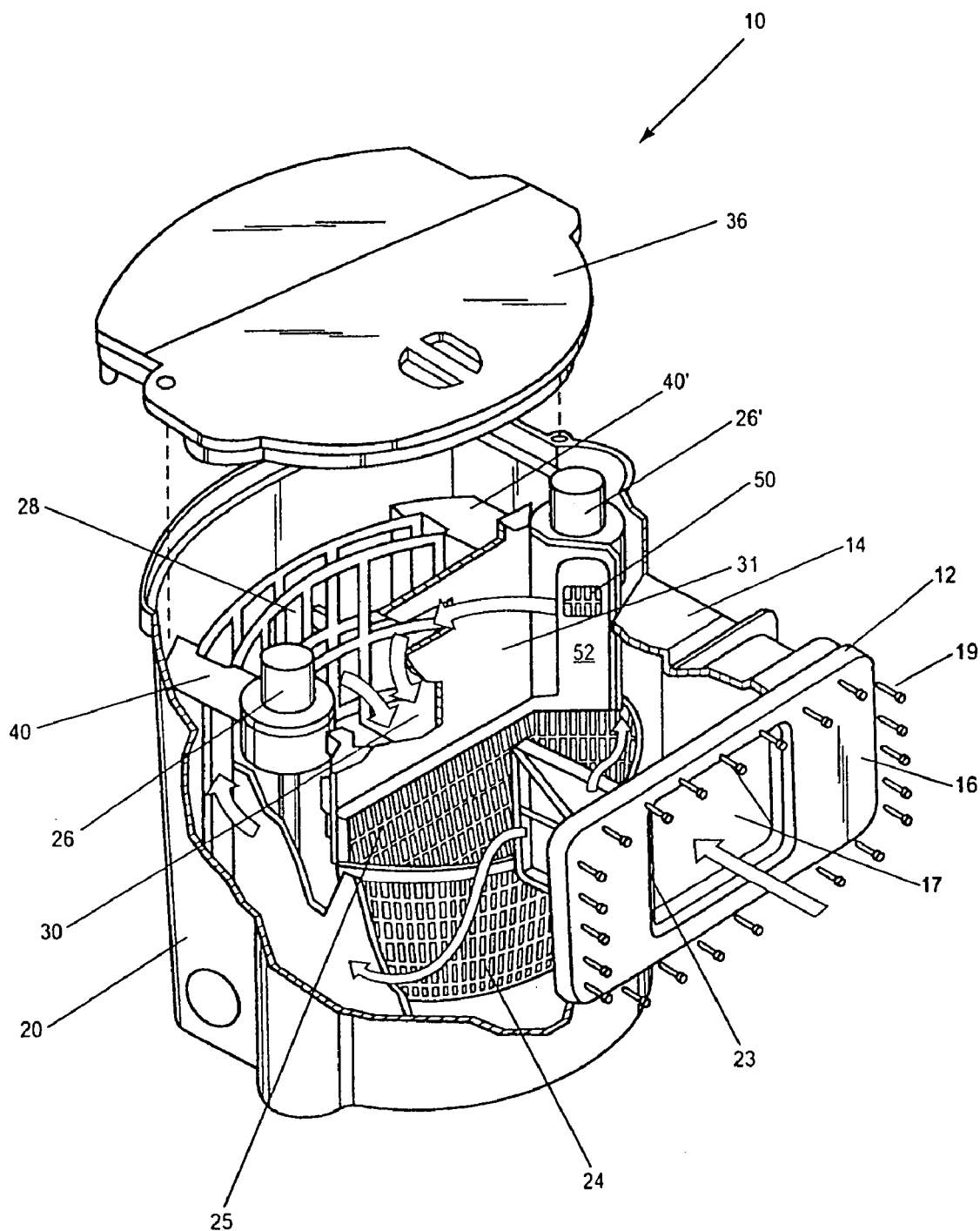
FIG. 1 is a perspective, cutaway, exploded view of an embodiment of a skimmer and filter with two ultraviolet light chambers and a single filter cartridge in the filter chamber.

Referring to FIG. 1, a perspective, cutaway, exploded view of skimmer and filter unit 10 is shown with two microorganism eradication components/systems such as ultraviolet light chambers 26 and 26'. Unit 10 includes a generally upright tank or housing 20 comprising generally cylindrical-like proportions. In other words, the axial cross-section of housing 20 may comprise any combination of curves and/or angles as long as housing 20 comprises at least at top and a bottom with at least one generally vertical wall therebetween such that housing 20 may be referred to as comprising a tank. Housing 20 may also comprise lid 36 which is preferably interlocking with housing 20. Housing 20 is in fluid communication with a body of water via a sealed, preferably mechanically sealed, skimmer faceplate assembly 12 and a water flow intake structure comprising an opening in which assembly 12 may be disposed. Such a structure allows the generally horizontal entry flow of water into housing 20 and may have dimensions and characteristics known in the art to accomplish such flow such as a "throat" or a "neck". In the figures, the construction is shown as neck 14. Neck 14 extends outward from a wall of housing 20 (but need not extend outwards as is readily understood in light of the requirement to simply allow for a flow as described herein) and comprises an opening and a skimmer faceplate assembly 12 located along the length of neck 14, preferably at or about the distal end of neck 14. As described and shown herein, faceplate assembly is of variable dimensions and such variability may be accomplished in any manner known in the art and as exemplified herein.

Thus, as illustrated in the figures, skimmer faceplate assembly 12 provides a watertight connection to concrete, flexible membrane or clay-lined bodies of water. The opening of neck 14 comprises weir opening 17 which is defined in weir faceplate 16 that passes water from the body of water into the housing 20. Faceplate 16 is attached to neck 14 with fasteners 19, including, but not limited to, screws, nuts and bolts, and the like. Faceplate 16 may comprise various sizes to adjust effective neck width, weir width, etc. thereby dealing with variable water flow rates, and neck 14 may accommodate the various sizes. Weir dividers 23 may be provided to slide into mating slots of neck 14 to form an appropriate-sized fluid conduit that coincides with the dimensions of opening 17 of faceplate 16.

Within housing 20 are a chamber with a collection basket disposed within, both hereafter also referred to as skimmer chamber 24 and skimmer basket 25, respectively. Also in housing 20 is filtration chamber 28 within which is a filter component, and pump chamber 30. These components remove debris, various suspended and dissolved organic wastes, and living organisms, such as single-celled algae, protozoa, and bacteria. Also in housing 20 are one or more microorganism eradication systems, such as, but not limited to, ultraviolet light systems represented in the figures by ultraviolet (UV) light chambers 26 and 26' (two are shown), ozone systems, sonic or ultrasound systems, etc., defined by the interior of tank or housing 20. Housing 20 contains a container having openings for the passage of water such as a removable, preferably, but not necessarily, semi-rigid, perforated skimmer basket 25 within skimmer chamber 24 to collect floating debris from the water after the water has passed through and over pivoting and buoyant weir door 18 (see also FIG. 4) and past weir divider 23. UV light chambers 26 and 26' are positioned and in water communication with skimmer chamber 24.

Water flow, indicated with arrows, enters tank 20 through opening 17 over weir door 18, downward through skimmer chamber 24, then through one or more unidirectional ports located at the lower periphery of tank 20 through partitioning wall 31 to UV light chambers 26, 26' which subject the water to high-intensity UV light for purification and eradication of contaminants such as single-celled algae. After passing through UV light chambers 26, the water continues through ports to filter chamber 28 for the mechanical removal of suspended solids and biological treatment for the removal of dissolved organic compounds. Filter chamber 28 can perform this function with one or more cartridge-based bio-mechanical filter mats, or other suitable filtration means. After being drawn through filter chamber 28, centrally located pump chamber 30 (example shown in FIG. 14) pumps the water away from unit 10 back to the body of water.

Figure 2:
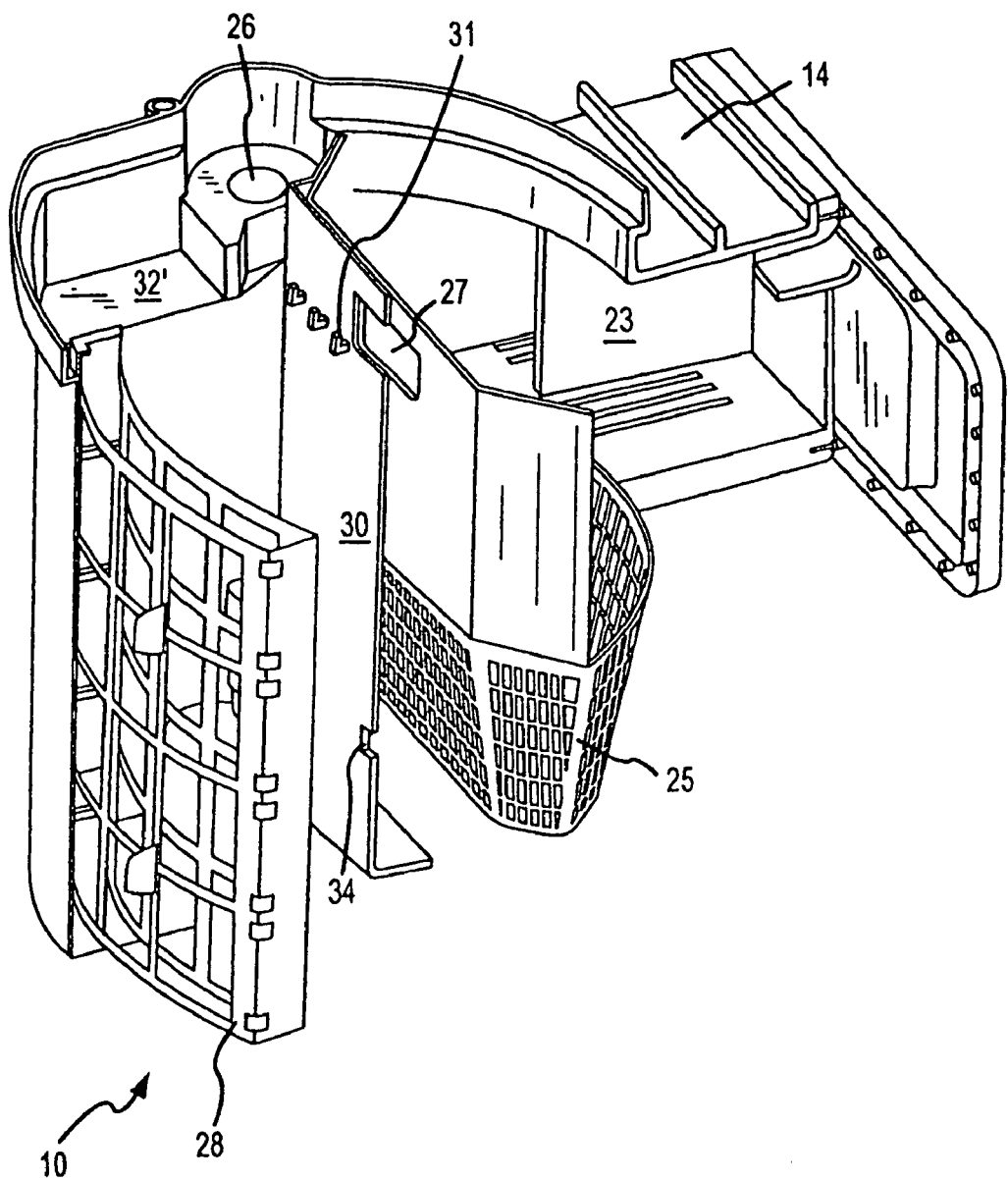
FIG. 2 is a perspective, cutaway view of the skimmer and filter of FIG. 1 showing partitioning walls.

Although in various embodiments within the scope of the present invention, the skimmer collection basket, filter, microorganism eradication system, and other components may be located within the same compartments or chambers, they are preferably separated into chambers by one or more partitioning walls. Thus, the figures show such partitions. Turning to FIG. 2, a perspective, cutaway view of skimmer and filter unit 10 of FIG. 1 reveals the partitioning walls between the chambers. Partitioning walls 32 separate UV light chambers 26 and filter chamber 28. Partitioning wall 31 separates skimmer chamber 24 from pump chamber 30, filter chamber 28, and UV chambers 26.

Figure 3:
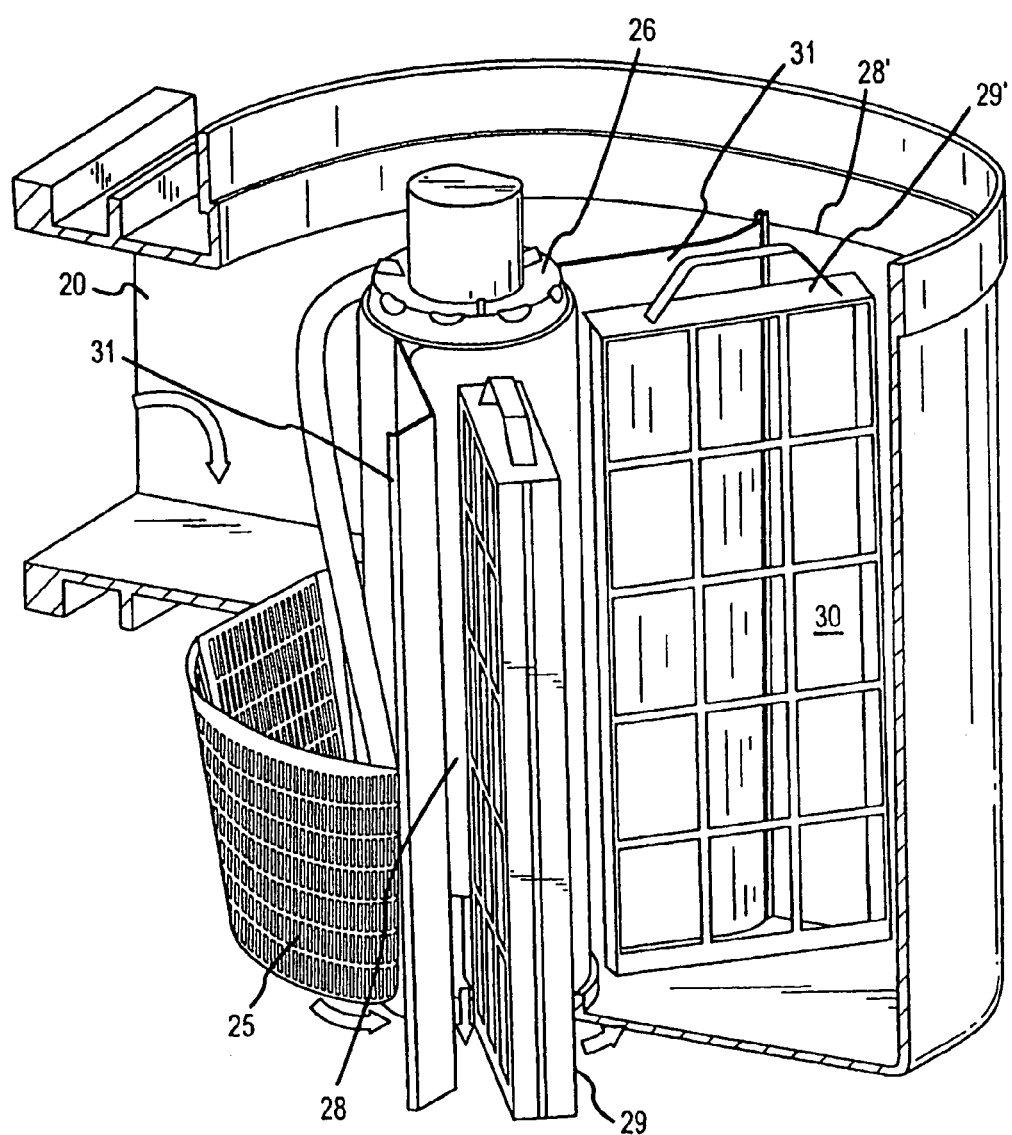
FIG. 3 is a perspective, cutaway view of an embodiment of a skimmer and filter showing application of a single centrally located ultraviolet light chamber, two filter cartridges, and a rear pump chamber.
Figure 4:
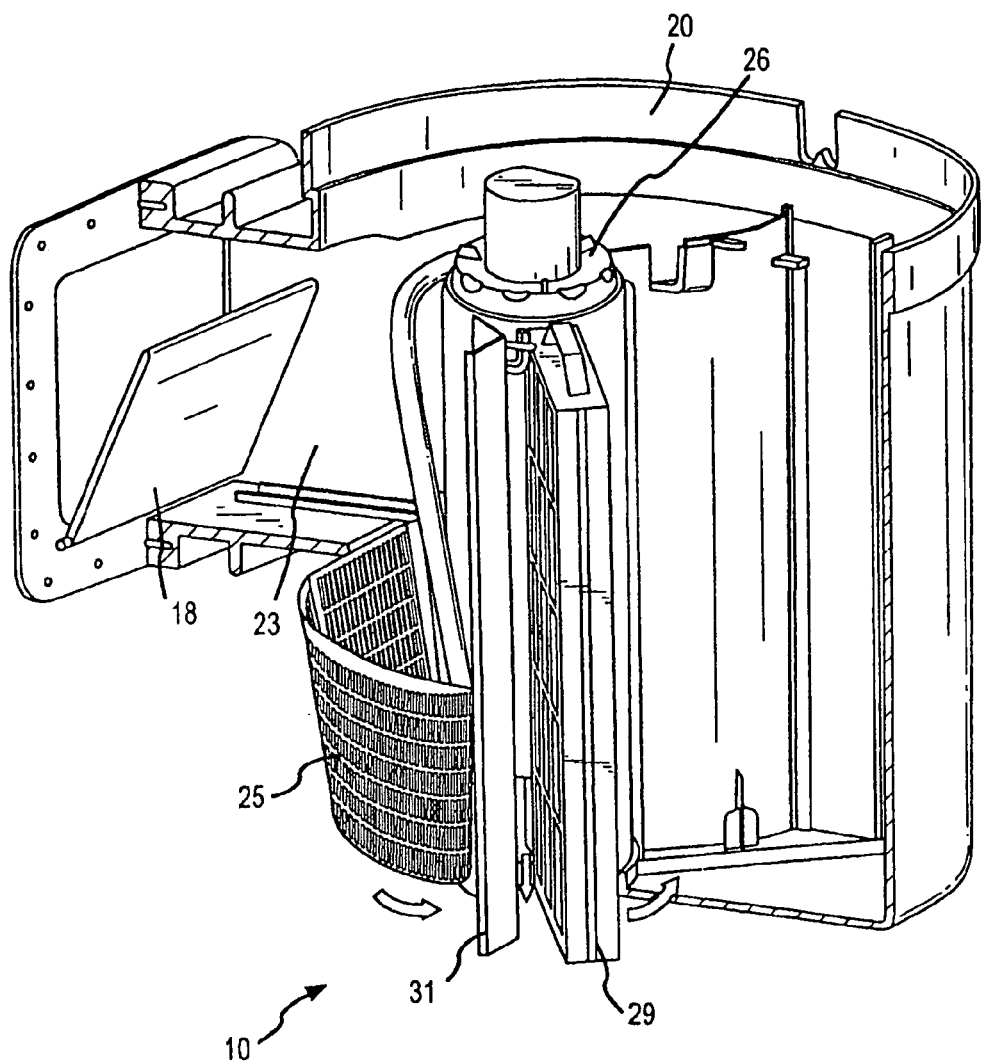
FIG. 4 is a perspective, cutaway view of the skimmer and filter of FIG. 3 showing the weir door and a weir divider from the interior.
Figure 14:
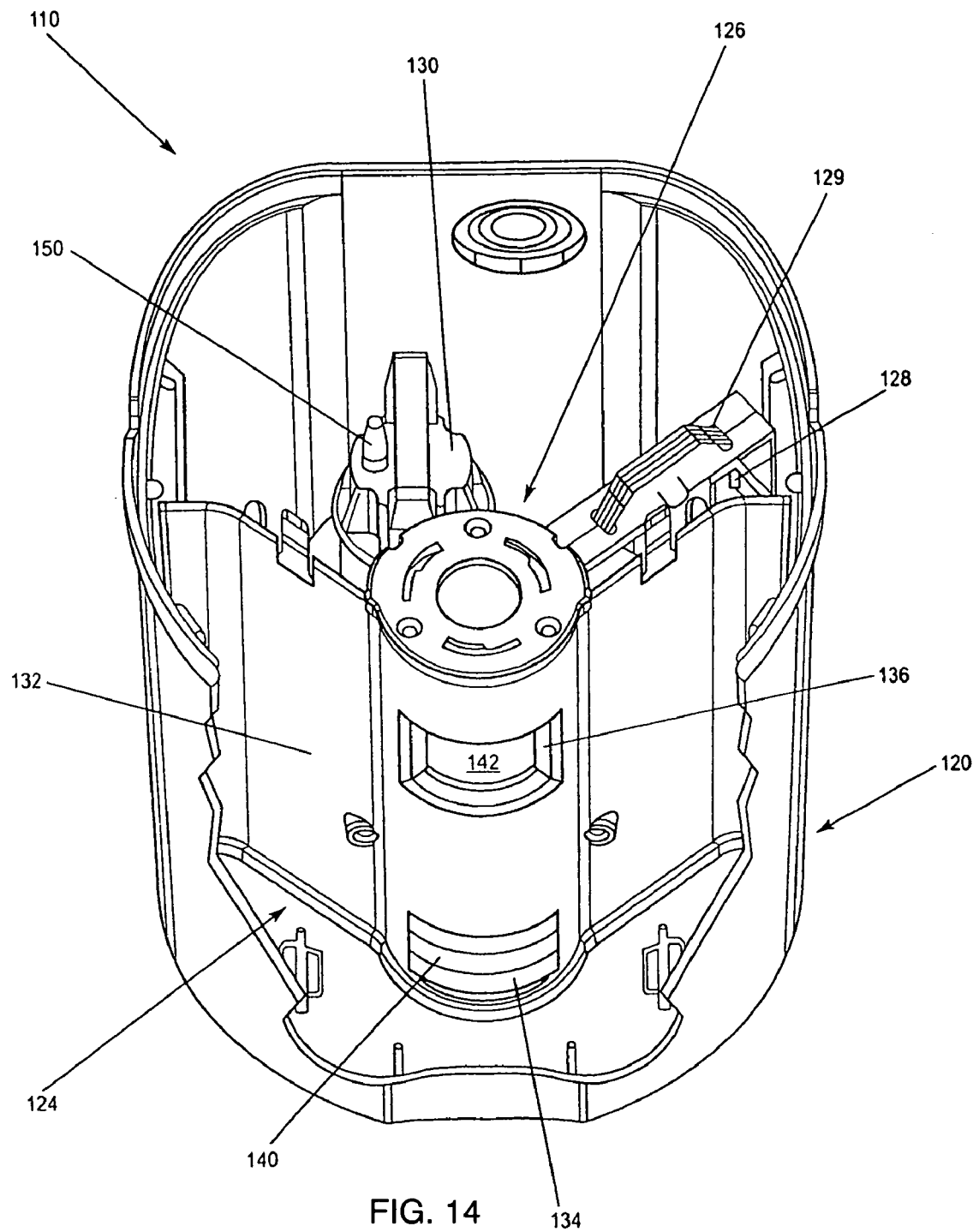
FIG. 14 is a perspective, cutaway view of another embodiment of a skimmer and filter showing application of a single centrally located ultraviolet light chamber, two filter cartridges, and a baffle.
Figure 15:
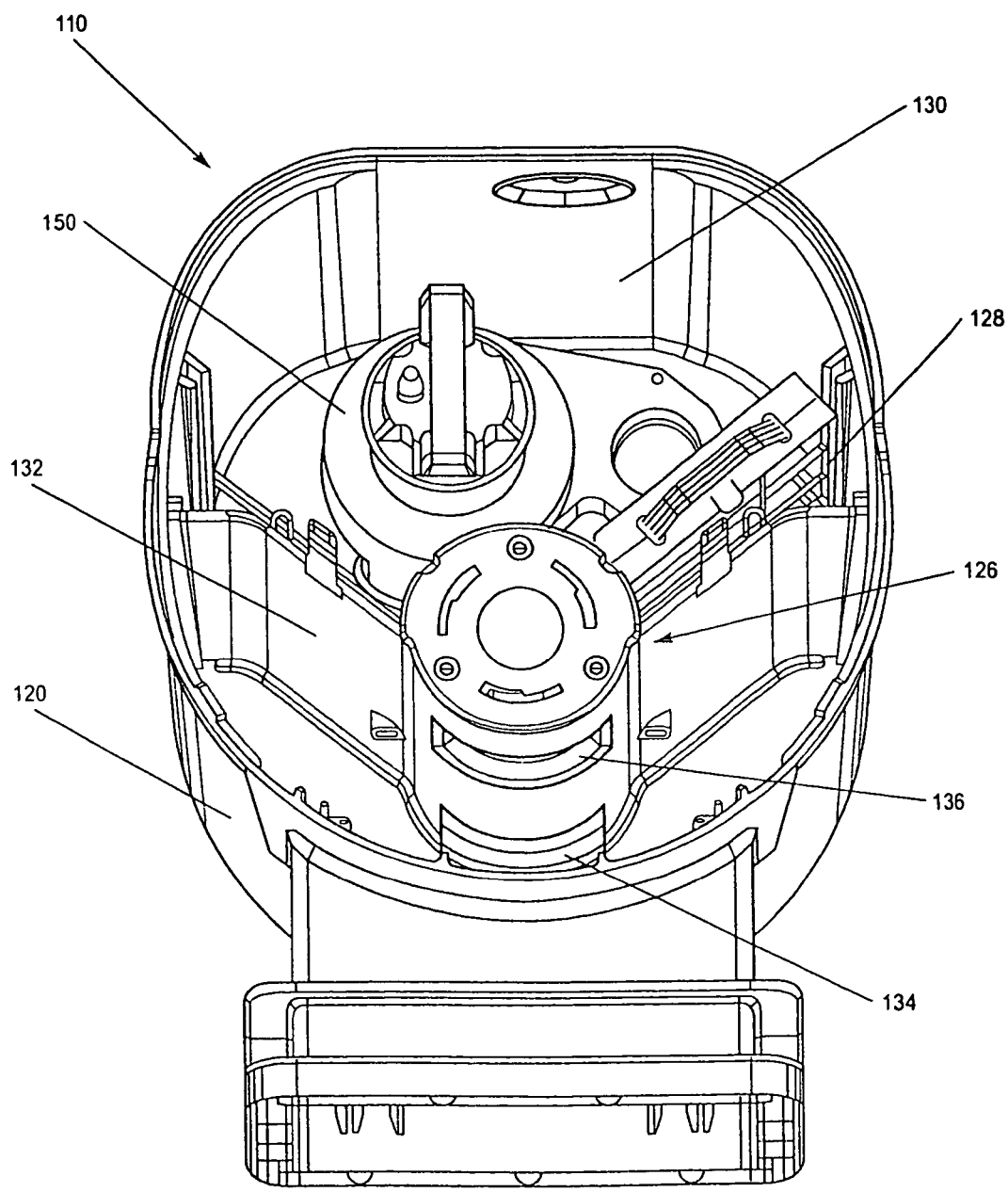
FIG. 15 is a perspective, cutaway view of the skimmer and filter of FIG. 14 showing the weir opening and door.

Referring to FIG. 3, a perspective, cutaway view of skimmer and filter unit 10 shows application of a single central UV chamber 26, two filter cartridges 29, 29' and a rear pump chamber 30 (an example of a pump is shown in FIG. 14). Pump chamber 30 houses one or more submersible water pumps that may be of various sizes, and pump chamber 30 accommodates fittings for attachment to an external pumping apparatus or drain fitting. Pump chamber 30 is preferably vertically-accessible for efficient removal of the pumping apparatus without disturbance of the bio-mechanical filter media of filter chamber 28 or other filtration components. FIG. 4 is a perspective, cutaway view of skimmer and filter unit 10 of FIG. 3 showing weir door 18 and weir divider 23 from the interior.

Figure 5:
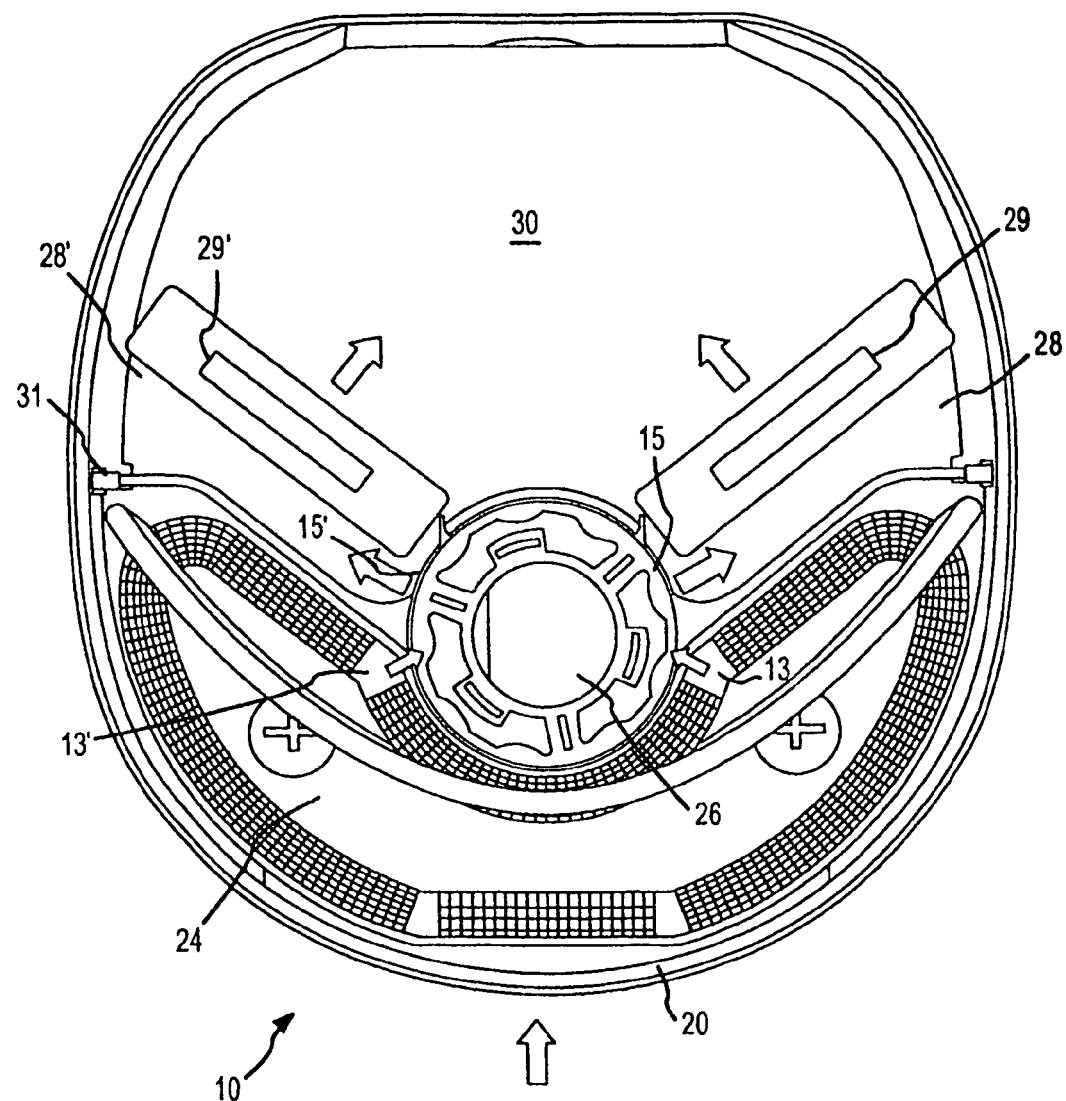
FIG. 5 is a top interior view of the skimmer and filter of FIGS. 3 and 4 with the neck portion removed.

FIG. 5 provides a top view of skimmer and filter unit 10 of FIGS. 3 and 4 with neck 14 removed. Water enters over the weir door and travels downward through skimmer basket of skimmer chamber 24. After passing through the skimmer collection basket, the water travels through unidirectional ports 13, 13', located in a lower portion of wall 31 near the bottom of housing 20, into central UV chamber 26. Water then travels from UV chamber 26 out of unidirectional ports 15, 15' to filter chamber 28 where it passes through filter cartridges 29, 29'. After passing through filter cartridges 29, 29' the water is pulled into pump chamber 30 where it is expelled back to the body of water by the pumping apparatus.

Figure 6:
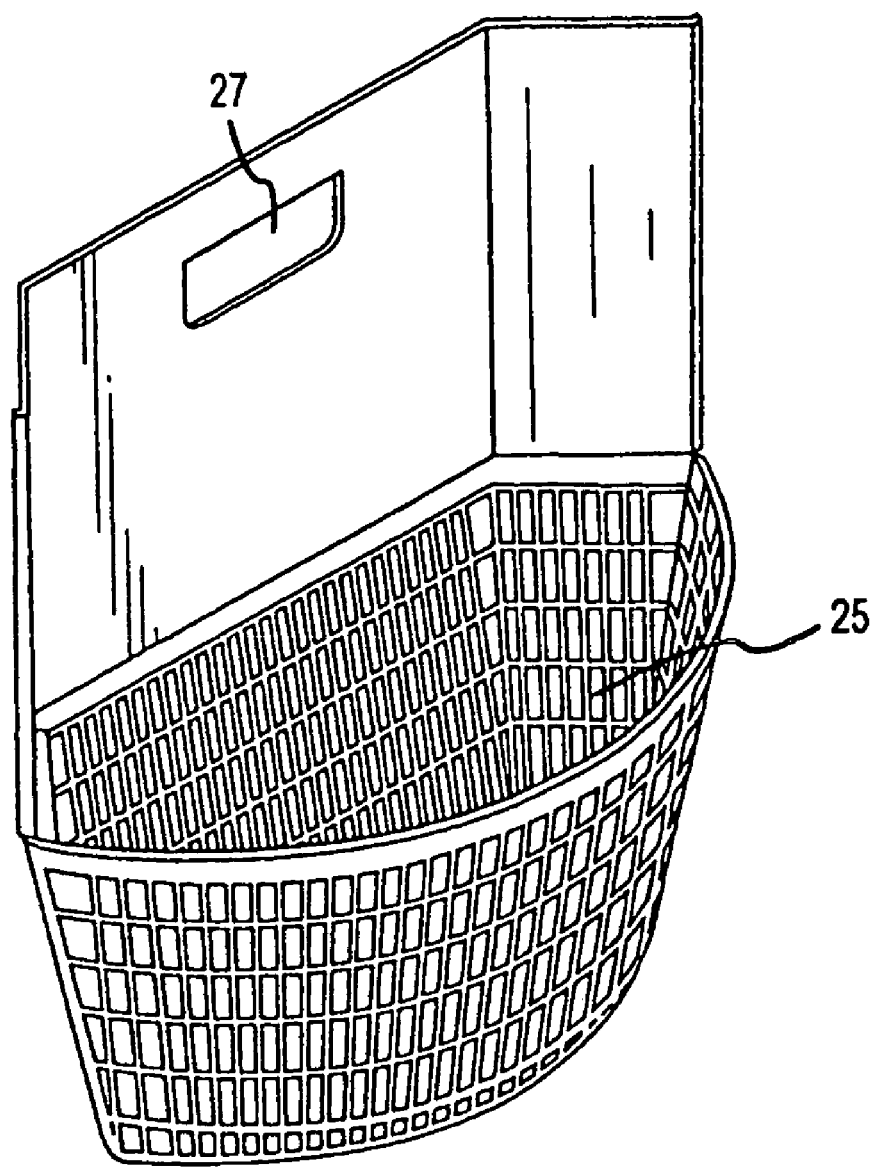
FIG. 6 is a perspective view of an embodiment of the skimmer collection basket of the skimmer chamber.

Turning to FIG. 6, a perspective view of skimmer collection basket 25 of skimmer chamber 24 is shown. Skimmer basket 25 is removable by way of reaching into the interior of housing 20 and grasping handle 27 affixed to basket 25 by an extended planar panel that places handle 27 conveniently within reach after removal of lid 36 (See also FIG. 2.). In this manner, skimmer basket 25 is readily removed, cleaned, and/or replaced from housing 20 as needed.

Figure 7:
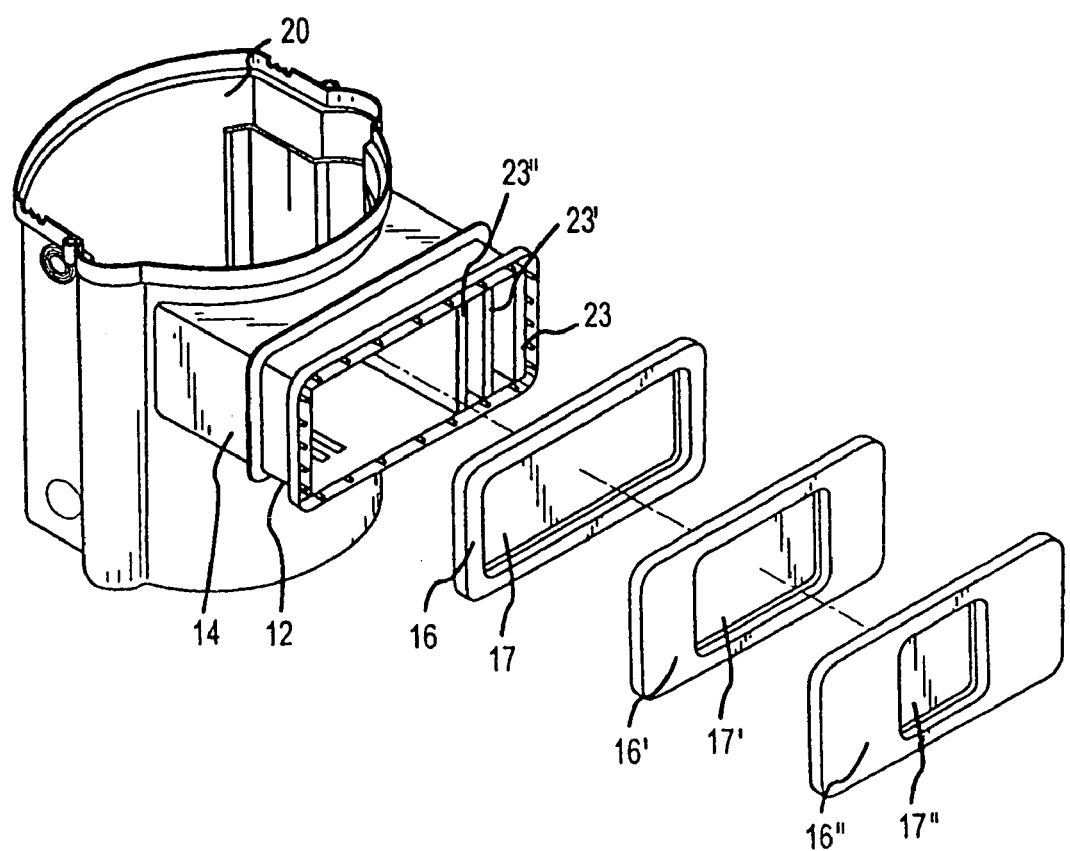
FIG. 7 is a perspective view of an embodiment of the skimmer and filter tank and a plurality of interchangeable weir faceplates.

Weir faceplate 16 preferably comprises adjustably variable dimensions. In the embodiment shown in FIG. 7, a perspective view of housing 20 of skimmer and filter unit 10 and a plurality of interchangeable weir faceplates 16 is shown. Each weir faceplate 16 defines an opening 17 of different dimensions to accommodate water flow. A pair of weir dividers 23 are used in conjunction with a particular weir faceplate 16 to guide water through neck 14 into skimmer chamber 24 (See also FIG. 8). Weir dividers 23, 23', and 23" are shown positioned vertically in the appropriate mating slots of neck 14 behind skimmer faceplate assembly 12 to align with the width of openings 17, 17', and 17" respectively of weir faceplates 16, 16', and 16". For example, weir faceplate 16" defining opening 17" would require weir divider 23" and its opposite weir divider (not shown) to be positioned in the innermost mating slots of neck 14 to align with the width dimension of opening 17".

Figure 8:
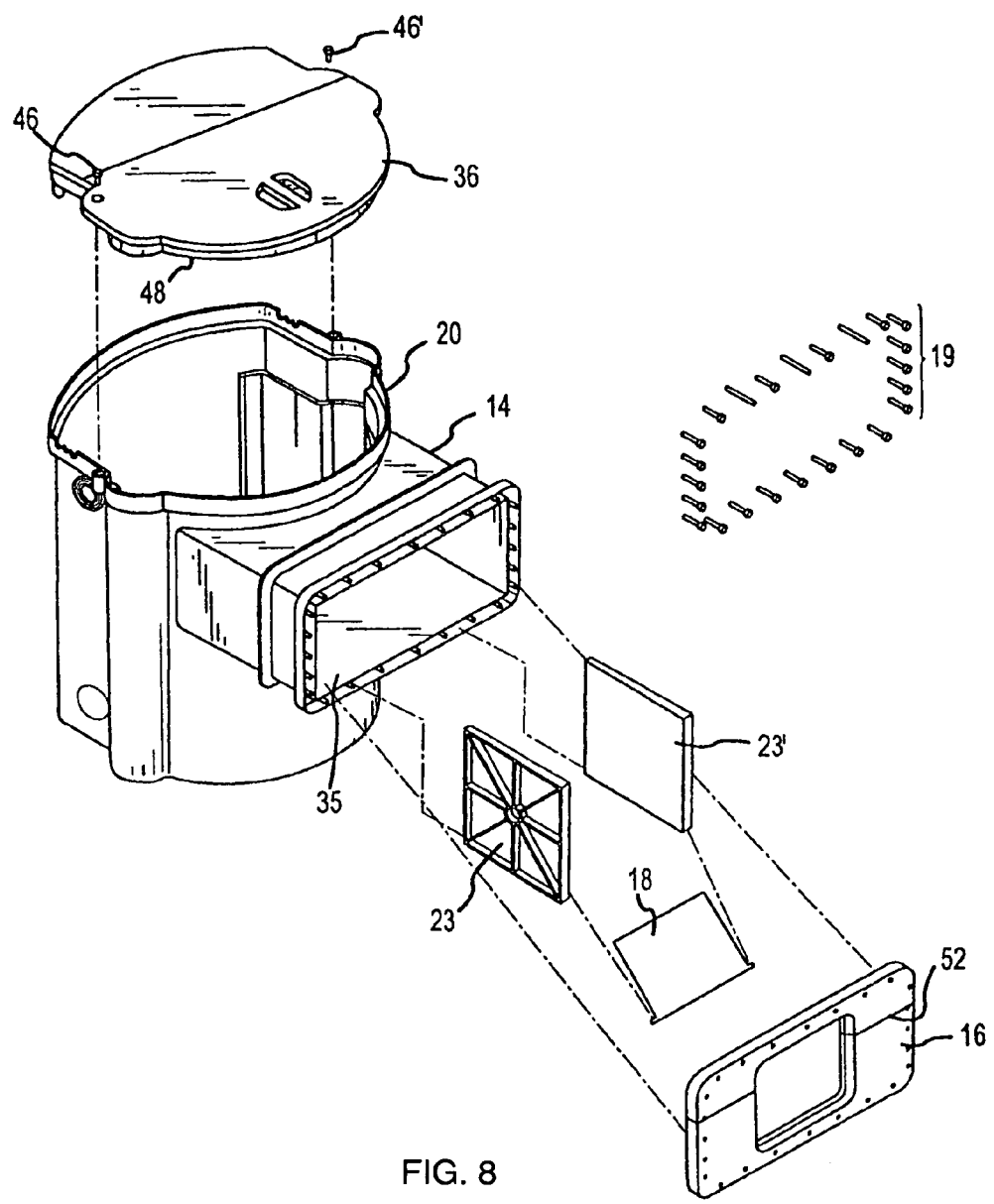
FIG. 8 is a perspective, exploded view of an embodiment of the tank, lid, weir dividers, weir door, and weir faceplate of the skimmer and filter.

FIG. 8 is a perspective, exploded view of tank 20, interlocking lid 36, weir dividers 23, weir door 18, and weir faceplate 16. Weir dividers 23 are frictionally fit into mating slots 35 of neck 14. Weir door 18 is frictionally fit into notches in lower corners of weir dividers 23 via mating hinge tabs at the lower corners of weir door 18, such that weir door 18 pivots in response to water pressure. Weir faceplate 16 is secured to neck 14 with fastening means 19 through mating openings 21 (See FIG. 9) in weir faceplate 16 and neck 14. In the event that the body of water is lined with a flexible membrane, or liner, the liner can be positioned between neck 14 and weir faceplate 16 and an incision made through the liner near the top of skimmer opening 17 to allow water to pass into the skimmer. Preferably, the water level entering weir faceplate 16 is within 0.75 inches above or below water level mark 52 of faceplate 16 for optimal operation.

Figure 9:
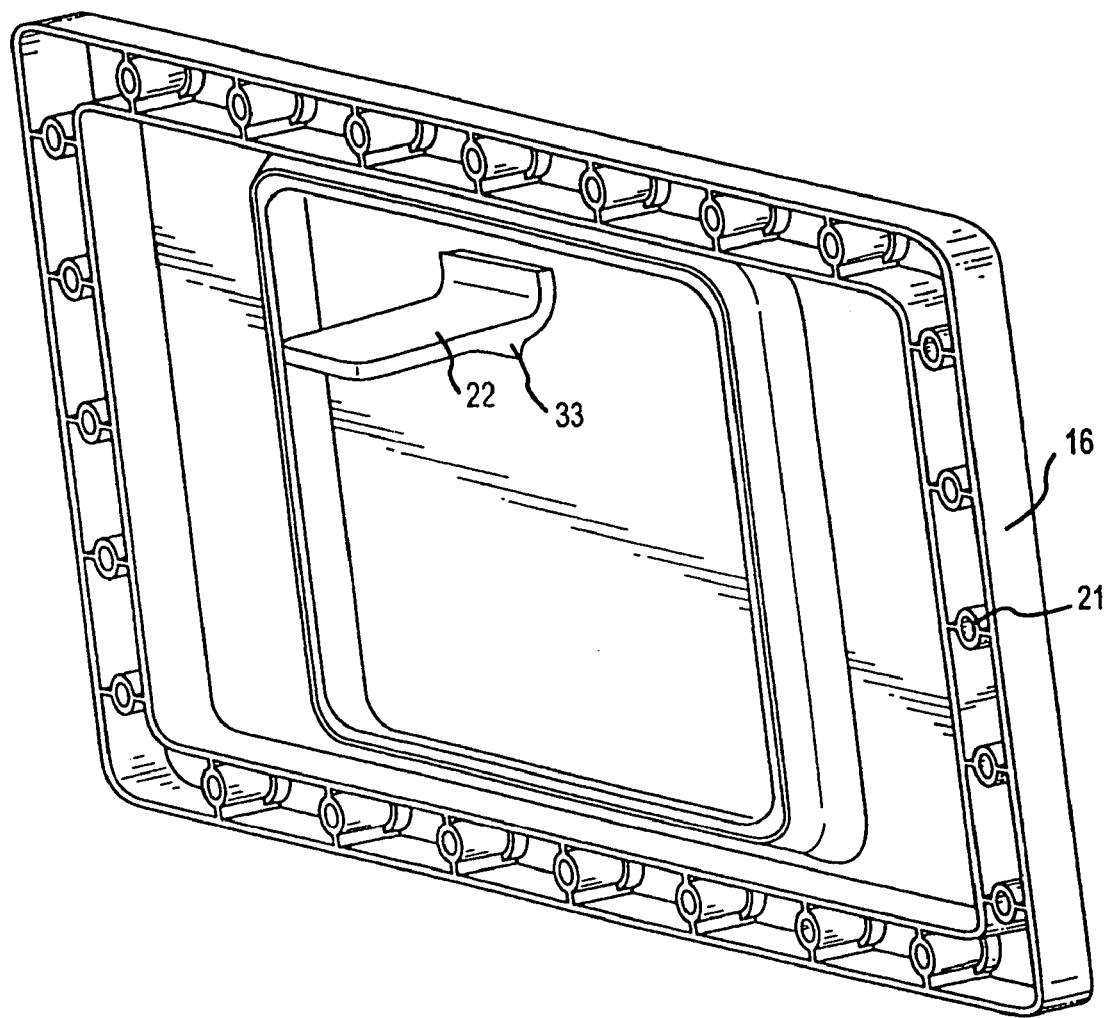
FIG. 9 is a rear perspective view of an embodiment of the weir faceplate.

Referring to FIG. 9, a rear perspective view of weir faceplate 16 is shown. Flexible locking tab 22 is used to secure weir door 18 in a closed position when cleaning or performing maintenance on skimmer and filter unit 10. To lock weir door 18 in a closed position to prevent fluid communication between unit 10 and a body of water, weir door is rotated upward and the top of weir door 18 is secured behind catch 33 of locking tab 22. To release weir door, locking tab 22 is pressed upward and door 18 is released from its position behind catch 33.

Figure 10A:
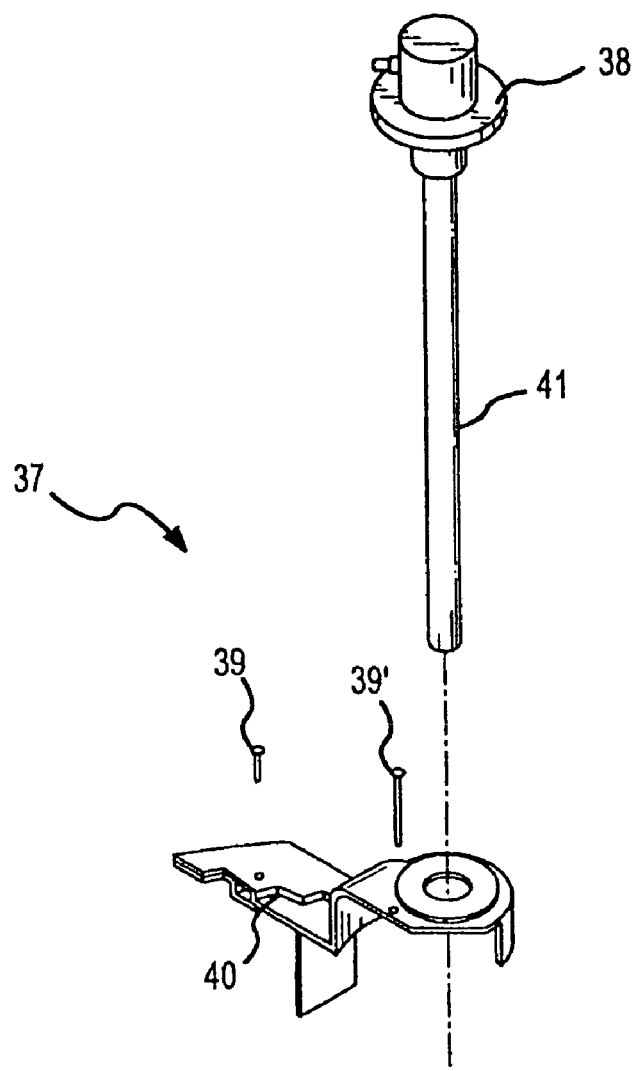
FIG. 10a is a perspective exploded view of an embodiment of the ultraviolet light assembly and associated mount.
Figure 10B:
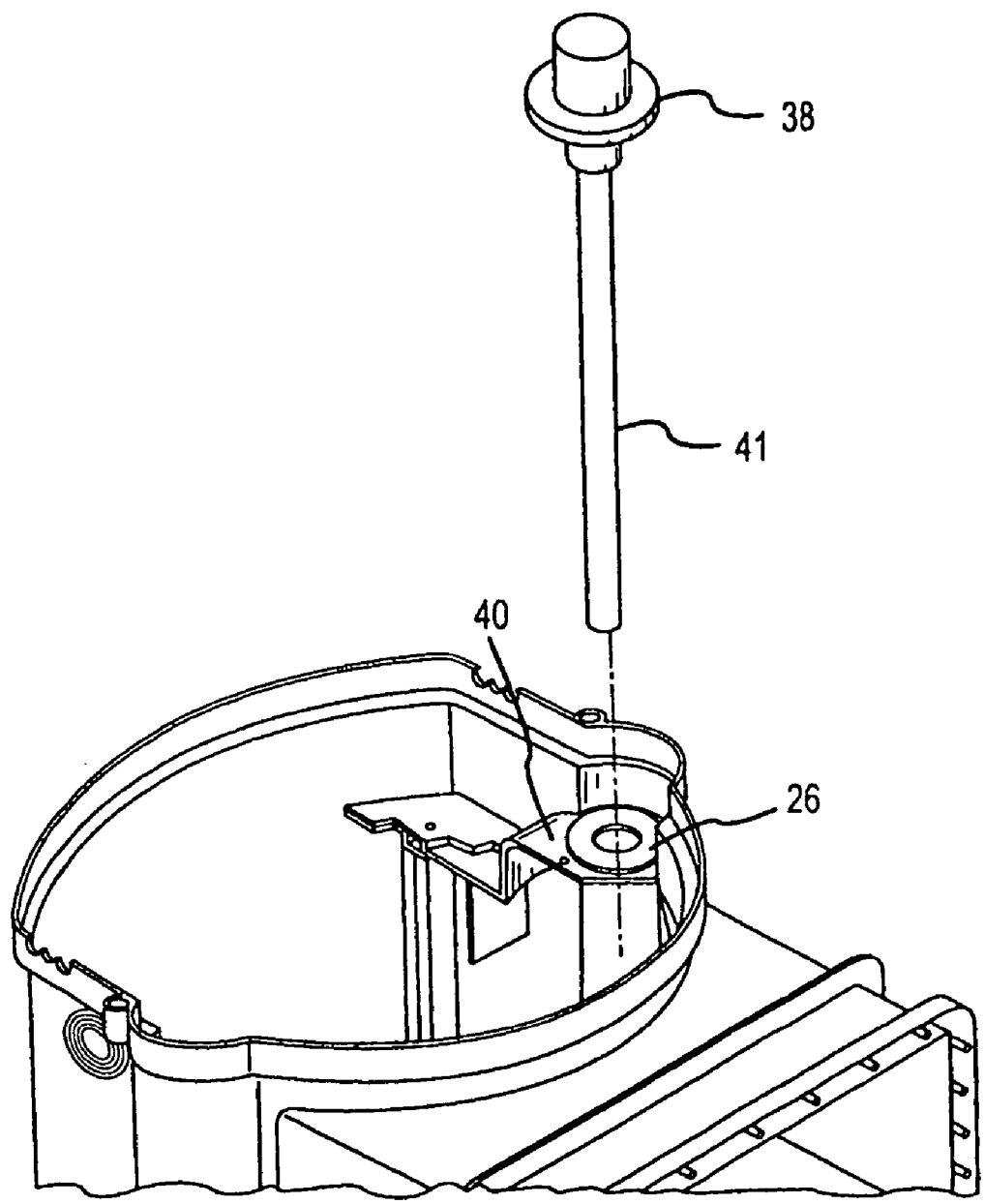
FIG. 10b is a perspective exploded view of the ultraviolet light assembly and associated mount of FIG. 10a as assembled into the skimmer and filter unit.

As noted above, in addition to the skimming and filtering features of the skimmer and filter unit 10, a microorganism eradication system may be incorporated for purifying or disinfecting water. FIGS. 10a and 10b are perspective exploded views of a UV light assembly 37 as assembled into housing 20 of skimmer and filter unit 10. UV mount 40 is affixed to the upper surface of UV chamber 26 defined within tank 20 with UV mount fastening means 39, such as but not limited to screws, or nuts and bolts. UV light 41 that is affixed to locking ring 38 is positioned through UV mount 40 and into UV chamber 26 so that UV light 41 is fully inserted into UV chamber 26. Tabs on locking ring 38 are inserted into mating slots in UV mount 40. Once inserted, locking ring 38 is rotated approximately ¼ of a turn to secure UV light assembly 37 into UV light chamber 26. A power source, such as one or more batteries or electrical connection to a power outlet, is used to power lights 41.

Figure 11:
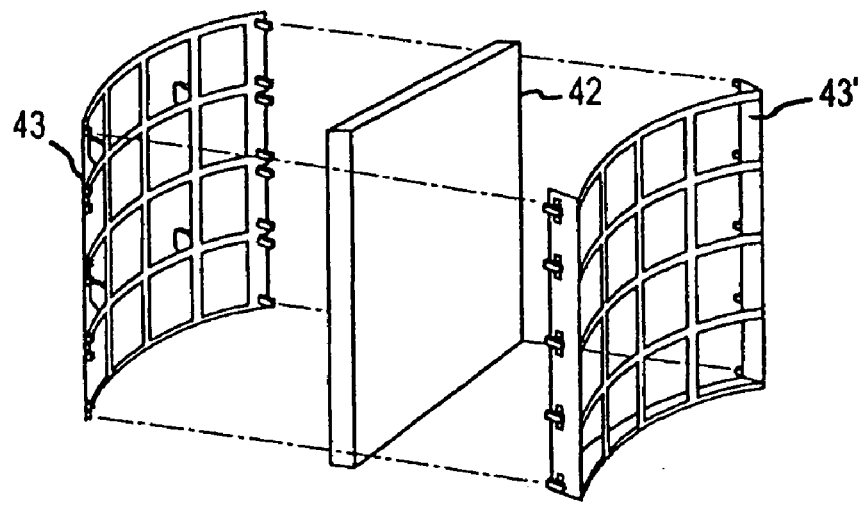
FIG. 11 is a perspective exploded view of an embodiment of filtration media for the filter chamber of the skimmer and filter.

Water is filtered within filter chamber 28 after the water has been treated with UV light in UV chambers 26. FIG. 11 provides a perspective exploded view of filtration media for filter chamber 28. Filtering can be achieved, for example, with a bio-mechanical filter mat 42, or other suitable filtration means, secured within a housing or cartridge 43 that is placed within filter chamber 28.

After the water passes through filter chamber 28, it enters pump chamber 30 where a pump pumps the water away from the skimmer and filter unit 10 back to the body of water. Occasionally, filter mats 42 become clogged with debris, which can prevent a sufficient flow of water to the pump. To prevent this from occurring, float-actuated bypass valve 34 is integrated into partitioning wall 31 (see FIG. 3) between skimmer chamber 24 and pump chamber 30 to monitor the level of water within pump chamber 30 and allow additional water to flow into pump chamber 30 from skimmer chamber 24 should the water level be insufficient.

Figure 12A:
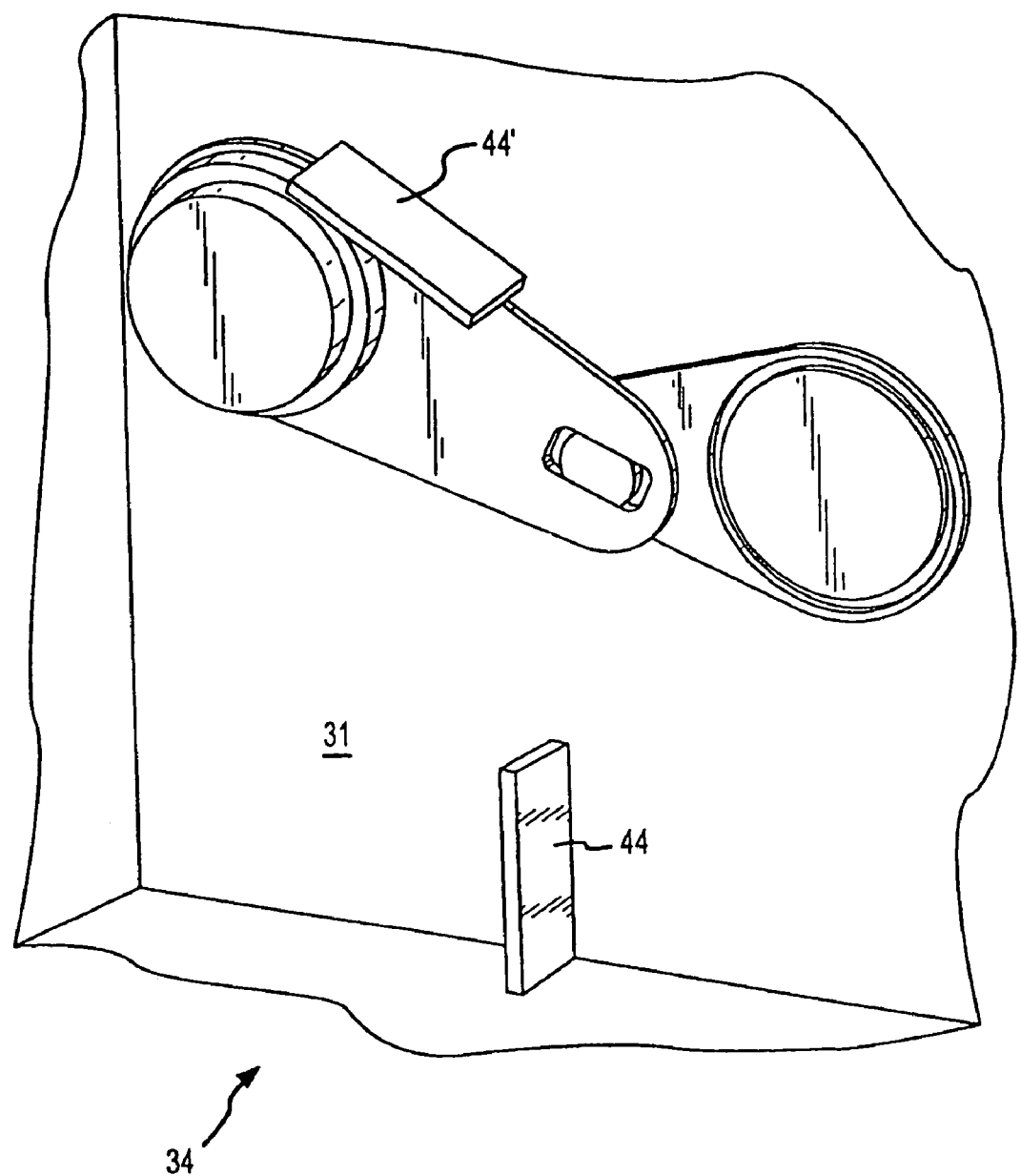
FIG. 12a is a perspective view of an embodiment of the flow bypass valve in the closed position.
Figure 12B:
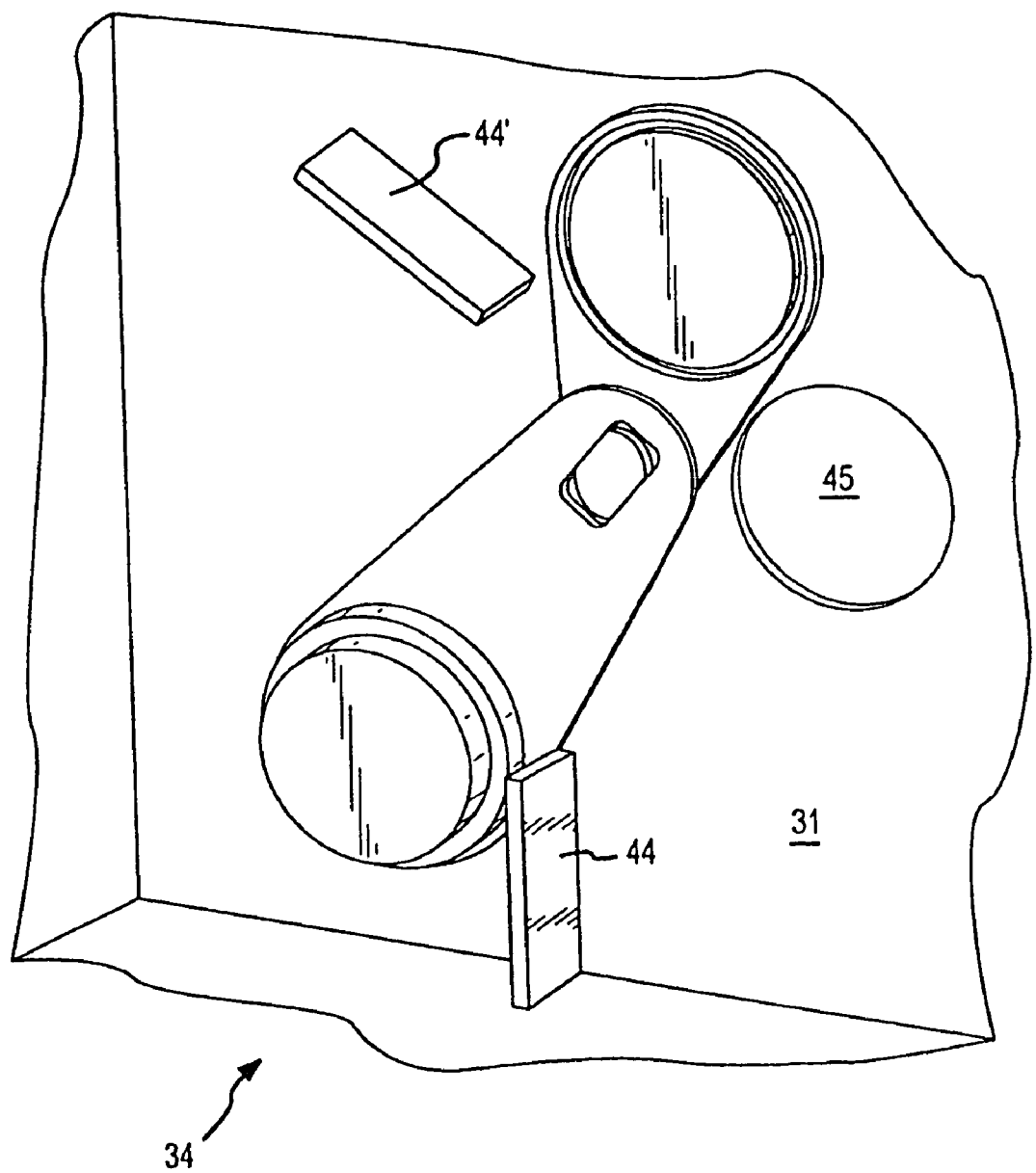
FIG. 12b is a perspective view of the flow bypass valve of FIG. 12a in the open position.

Referring in combination to FIGS. 12a and 12b, perspective views of bypass valve 34 in the closed and open positions are shown, respectively. When the water level in pump chamber 30 is sufficiently high, valve 34 floats to the upper position and is stopped by stop 44' affixed to partitioning wall 31. At this point, valve 34 blocks the flow of water through opening 45 defined in wall 31. Should the water level in pump chamber 30 drop, valve 34 drops until stopped by stop 44 affixed to partitioning wall 31, and unblocks opening 45 defined in wall 31 thereby allowing the flow of water from skimmer chamber 24 into pump chamber 30.

Figure 13A:
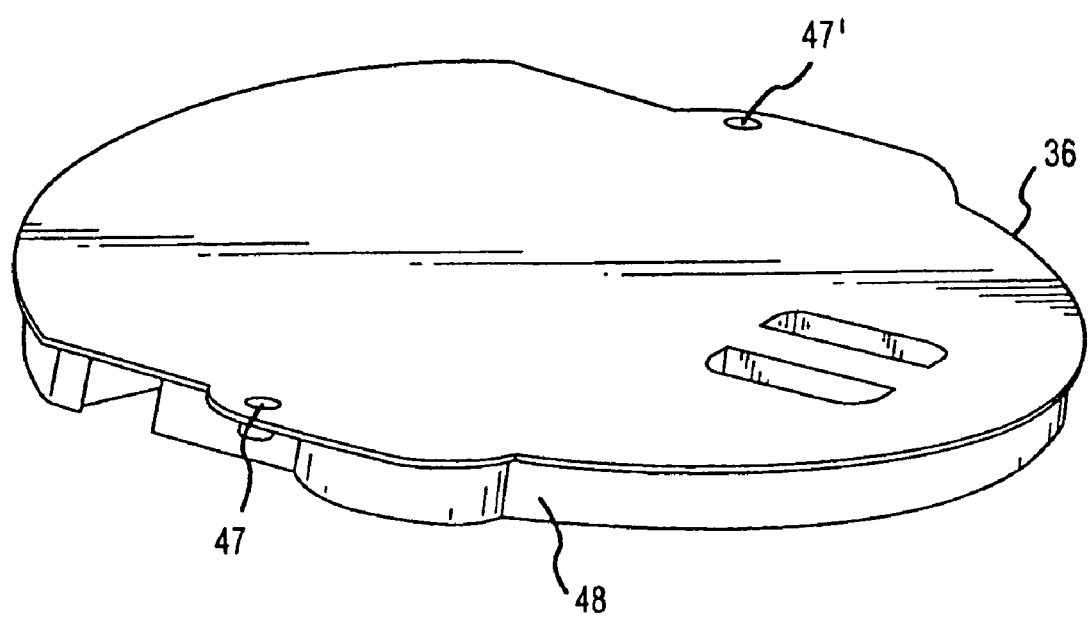
FIG. 13a is a perspective view of an embodiment of the interlocking lid of the skimmer and filter.
Figure 13B:
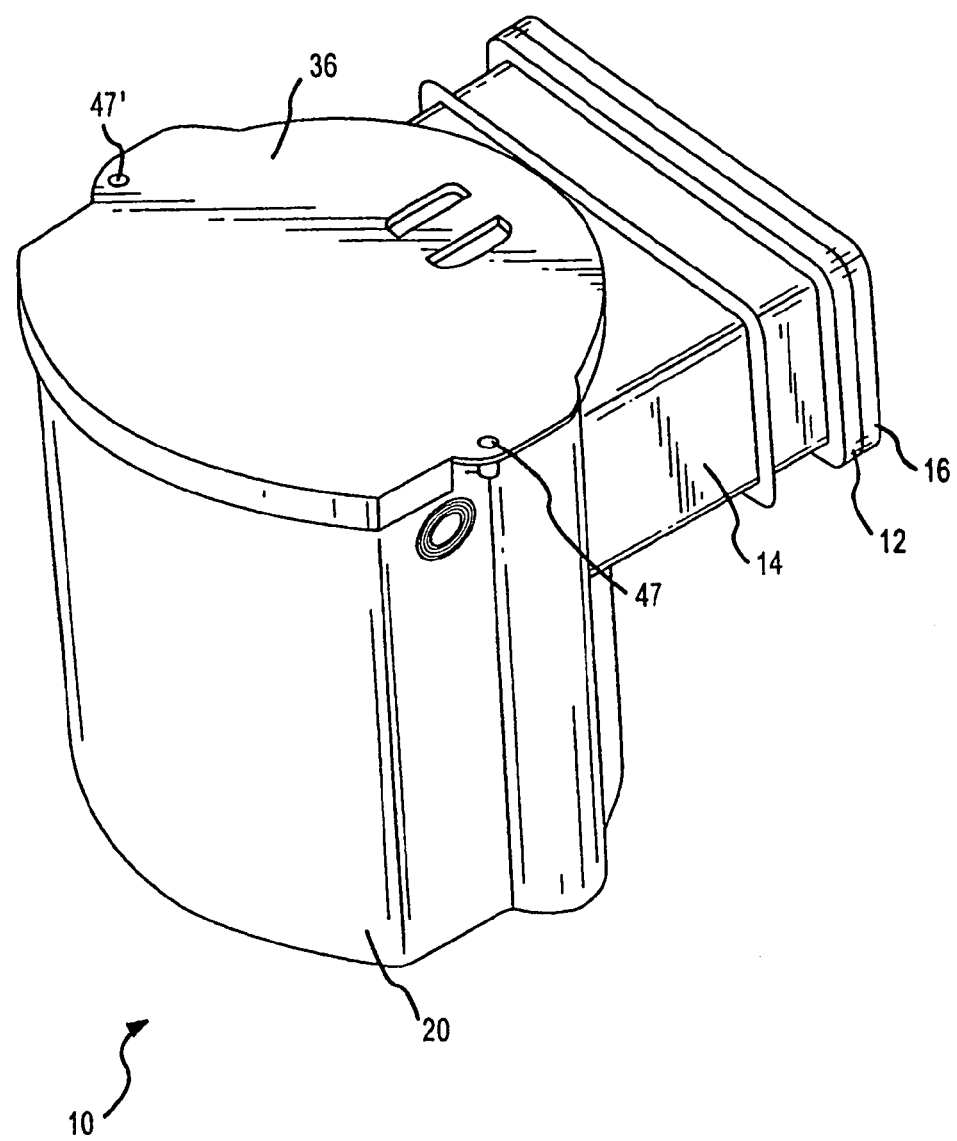

Skimmer and filter unit 10 is protected from the environment by tank 20 and lid (preferably interlocking) 36. Turning to FIGS. 13a and 13b, interlocking lid 36 and interlocking lid 36 affixed to housing 20 of skimmer and filter unit 10, respectively, are shown. Lid 36 interlocks to housing 20 by stabilizing flange 48, which extends around the periphery and orthogonally downward from the bottom planar surface of lid 36, mirrors the shape of, and mates with the interior upper surface of housing 20 (See also FIG. 8). Fastening means 46, such as but not limited to screws or nuts and bolts, are positioned through mating openings 47 defined in lid 36 and tank 20 to secure lid 36 to tank 20. Interlocking lid 36 having stabilizing flange 48 prevents deformation of skimmer and filter unit 10 particularly when installed in subterranean environments. The exterior surface of lid 36 is coarse for increased frictional contact with external surroundings.

As an example of a microorganism filtration system, ultraviolet light purifies the water and eradicates contaminants. In the embodiment of FIG. 1 with two UV chambers, a baffle block can be used to prevent water flow to one of the UV chambers 26 or 26'. For example, water bodies less than approximately 5000 gallons may require operation of only one UV chamber for sufficient purification. Table 1 provides examples of UV lighting power and approximate gallons per hour (GPH) of water flow required through the UV light chamber for sufficient water treatment:

TABLE 1

| Number of 25 Watt UV Lights | Number of 37 Watt UV Lights | GPH (mm-max) |
|---|---|---|
| 1 | 0 | 500-2500 |
| 0 | 1 | 500-4000 |
| 1 | 0 | 1200-2500 |
| 0 | 1 | 1200-4000 |
| 2 | 0 | 1200-5000 |
| 2 | 0 | 2500-5000 |
| 0 | 2 | 2500-8000 |

When beneficial bacteria are introduced to a body of water, power is preferably removed from the UV light for approximately 24 hours to allow the bacteria to settle.

As noted above, filtering can be achieved, for example, with a biomechanical filter mat, or other suitable filtration means, secured within a housing or cartridge that is placed within the filter chamber 28 of the embodiment shown in FIG. 1.

Referring now to FIG. 14, there is shown a perspective, cut-away view of another embodiment of a skimmer filter unit 110 shown with a single UV light chamber. The skimmer and filter unit 110 includes a housing 120 and may have an interlocking lid as shown in the FIG. 1 embodiment. Unit 110 is in fluid communication with the body of water via a mechanically sealed skimmer face plate assembly of the type shown and described with reference to the first embodiment. Within unit 110 is skimmer collection basket chamber 124, one or more filtration devices, one of which is shown at 128, a UV light chamber 126, and a pump chamber 130. The pump chamber 130 draws water into the skimmer and filter unit. Skimmer collection basket 125 removes the larger debris, such as leaves or other materials, from the water drawn into the skimmer filter unit, with debris collecting in basket 125. The filter 128 provides for the removal of suspended or dissolved organic waste including living organisms such as algae, protozoa and bacteria. A microorganism eradication system such as UV chamber 126 eradicates contaminants such as the algae, protozoa and bacteria.

Pump chamber 130 is separated from skimmer chamber 124 by partitioning baffle 132 which also separates filters 128 that are located above pump chamber 130. Baffle 132 has a midpoint approximately halfway along its height. One or more openings 136 are disposed above the midpoint of the baffle 132. Preferably, and additionally, one or more openings 134 are disposed below the midpoint of baffle 132. In addition, preferably one of the openings is disposed below the skimmer basket shown at 134 and another opening 136 is preferably positioned higher or above the skimmer basket upper rim.

Figure 16:
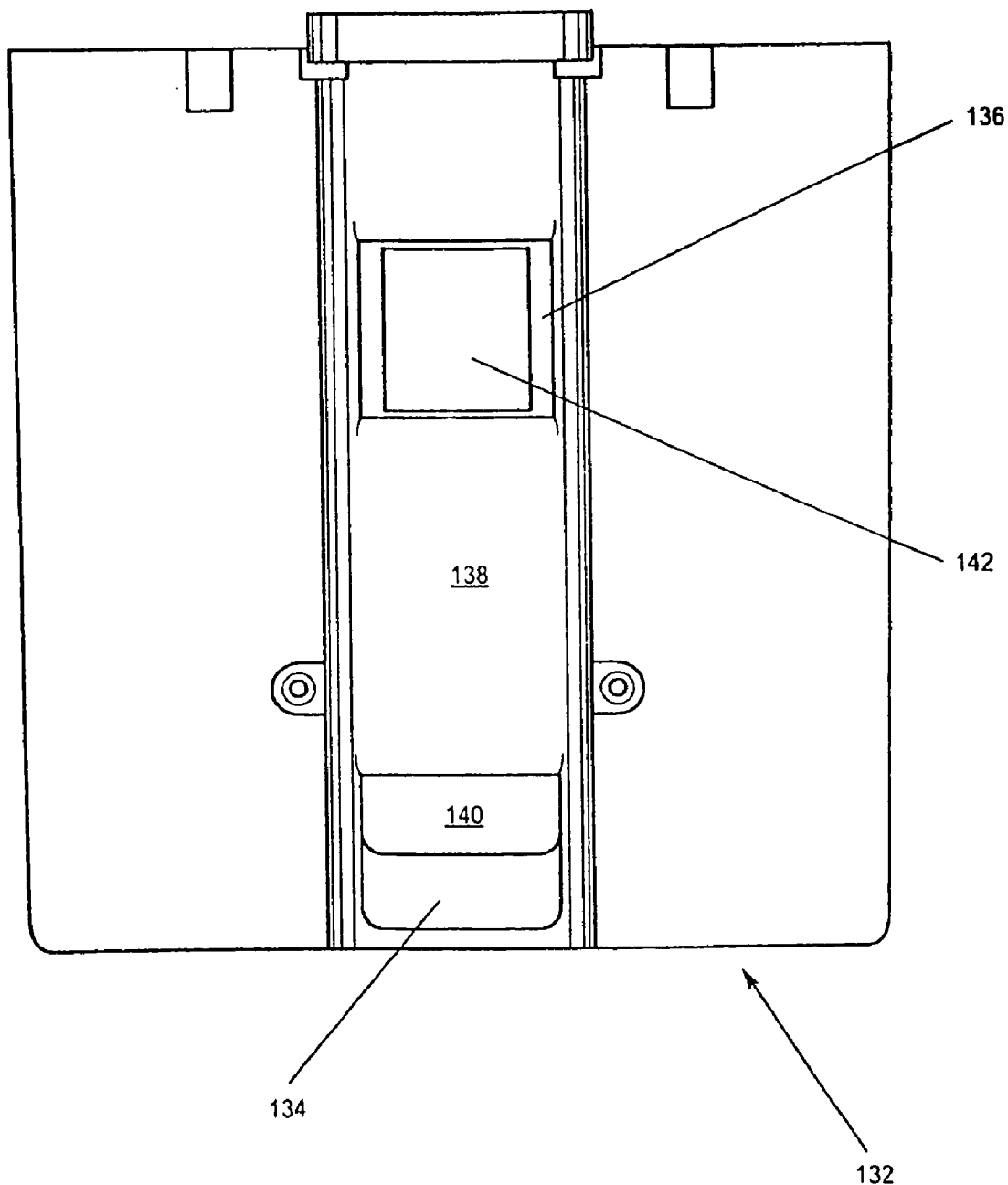
FIG. 16 is a front view of a partitioning baffle with openings for water to flow from the collection basket portion to the filter portion shown in FIG. 14.

Partitioning baffle 132 is best seen in FIG. 16 where ports or openings 134 and 136 are shown. Opening 134 is formed in a curved portion 138 of partitioning wall 132. Curved portion 138 includes tab 140 that descends into opening 134 but is laterally displaced so it bears against the corresponding curved portion of UV light chamber 126. This allows water to pass through opening 134. Similarly, opening 136 includes a member 142 that is laterally displaced so as to bear against the outer wall of UV chamber 126. Pump chamber 130 includes pump 150.

Referring back to FIG. 1, the embodiment with two UV light chambers 26 and 26', the ports or openings that are above the top level of skimmer basket 25 are shown at 50 in arm 52 that is connected to skimmer basket 25. Thus, for this embodiment, water flow through the skimmer and filter unit will be described in reference to FIG. 1, where the flow is indicated with arrows. Water enters housing 20 through opening 17 over weir door 18, and flows into skimmer chamber 24, then through the ports, one of which is shown behind screen or grate 50 located above the upper rim of basket 25. The water passing through the ports in partitioning baffle 31 flows into UV light chambers 26 and 26', which subject the water to high-intensity UV light for purification and eradication of contaminants such as single-celled algae or microorganisms. After passing through UV light chambers 26 and 26', the water flows into filtration chamber 28 for the mechanical removal of suspended solids and biological treatment for the removal of dissolved organic compounds. Filtration chamber 28, supported by UV mount 40 and 40', can perform this function with one or more cartridge-based biomechanical filter mats, or other suitable filtration methods and/or devices. After being drawn through filter chamber 28 into pump chamber 30, a pump (not shown) disposed therein pumps the processed water out of unit 10 back into the pond.

Figure 17:
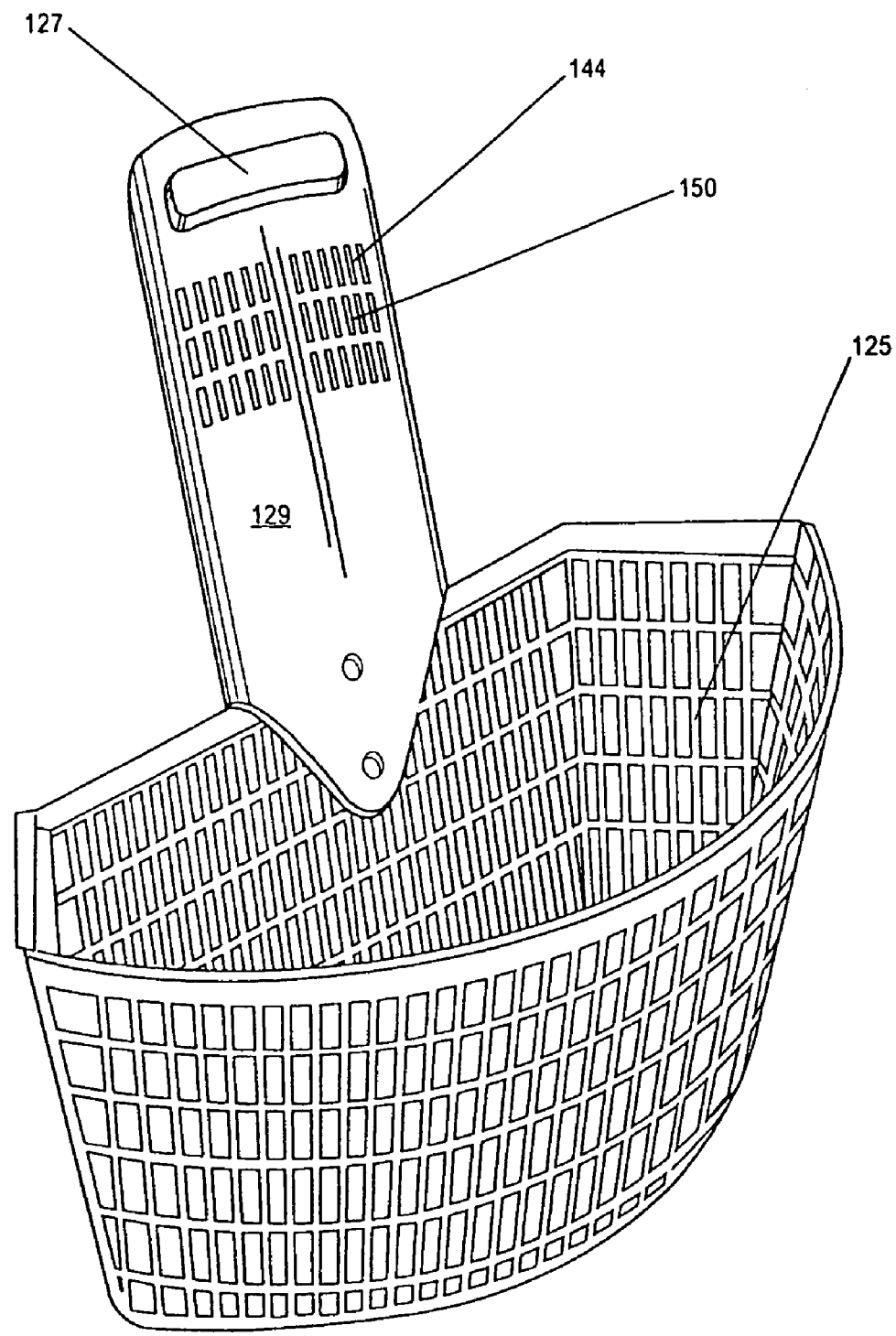
FIG. 17 is a perspective view of a skimmer basket for use in the skimmer and filter unit shown in FIG. 14.

FIG. 17 shows a perspective view of skimmer basket 125 of skimmer chamber 124 for use in the UV light chamber (preferably single UV chamber) embodiment of FIG. 14. Skimmer basket 125 is removable by way of reaching into the interior of tank 120 and grasping handle 127 affixed to an arm 129 extending upward from the top of basket 125 so as to place handle 127 conveniently within reach after removal of the skimmer filter unit lid. In this manner, skimmer basket 125 is readily removed, cleaned, and/or replaced from tank 120 as needed. Arm 129 also includes an opening or port 144 covered by screen 150 so as to block large debris from entering the UV chamber. Opening 144, when basket 125 is in position within skimmer chamber 124 directly overlies, or is in registry with, upper opening 136 in partition baffle 132 (see FIG. 14) thus allowing water to pass into the UV chamber even if the basket 125 is so clogged with debris that water cannot flow through basket 125 and thereby reach lower opening 134.

Figure 18:
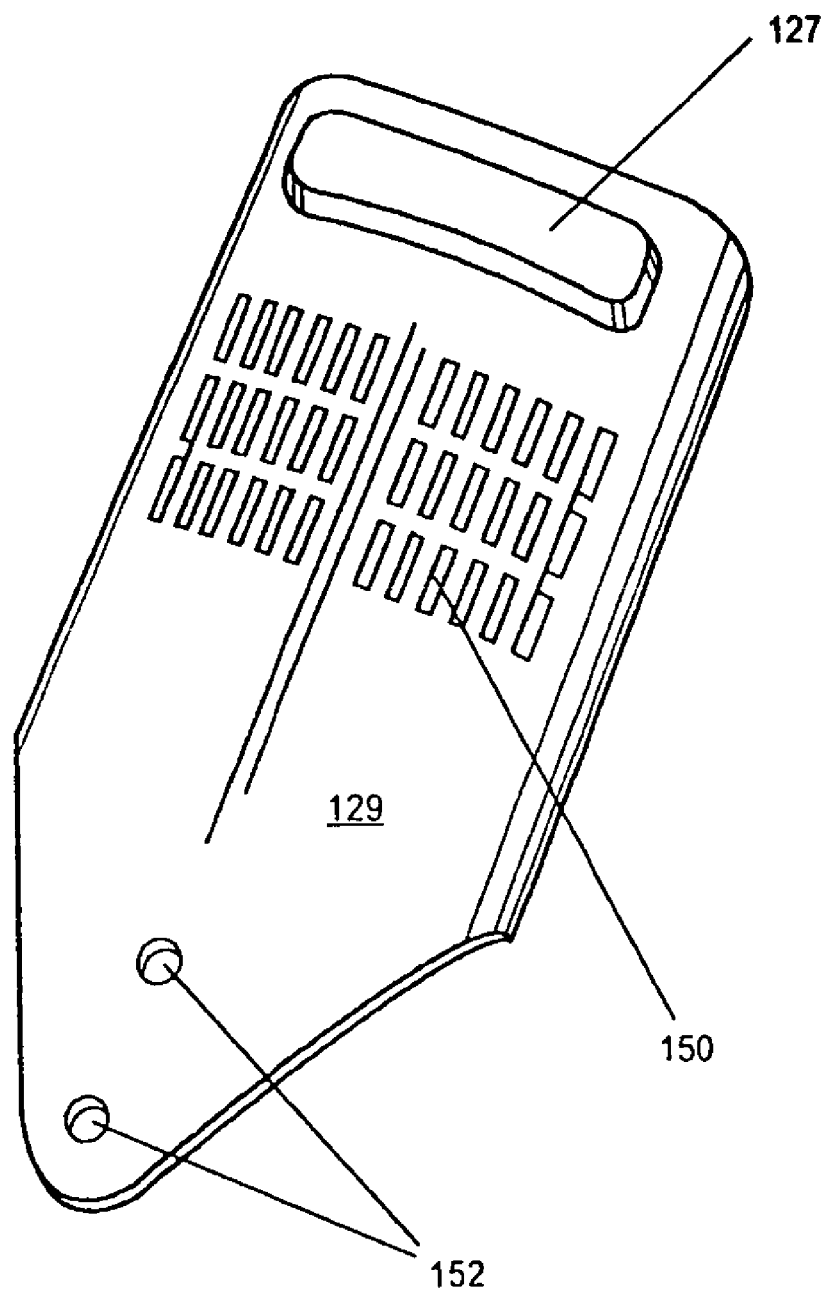
FIG. 18 is a perspective view of the basket arm shown in FIG. 17 with an opening covered by a screen or grate.

Referring to FIG. 18, arm 129 is shown having opening 144 and grate 150 that is formed integrally out of the arm 129 which may be a molded plastic piece including integral handle 127. Arm 129 is attached to basket 125 through fasteners or other attachment devices through openings 152. The purpose of grate or screen 150 is to serve as an auxiliary blocker of larger debris when either basket 125 or lower opening 134 of the single UV light chamber embodiment shown in FIG. 14 is restricted due to foreign debris, or in the event there is increased water flow, larger flow demand and/or filter demand. In that event, the water will continue to rise in chamber 124 above the top of basket 125 and it is necessary for continued functioning of the unit that the water is allowed to pass into the UV chamber through this upper non-clogged opening. But because the debris may then be flowing on the surface of the water as it rises to opening 144 it is still desirable to block or screen the floating debris from passing into the UV chamber from the skimmer chamber. Thus, the unit will continue to function as a skimmer as well as a filter.

Turning to FIG. 19, a perspective view of a landscape application for skimmer and filter unit 10 is shown. If the landscape application includes waterfall, skimmer and filter 10 is positioned opposite the waterfall at an end of a body of water for improved skimming and filtering operation. Preferably skimmer and filter unit 10 is positioned below ground level approximately six inches away from the coping shelf.

Figure 20A:
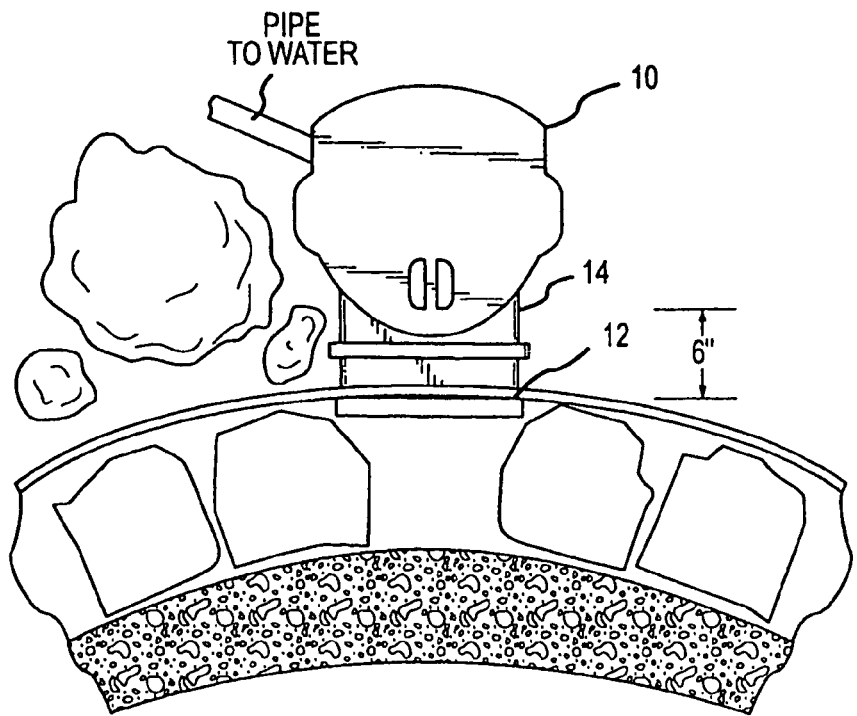
FIG. 20a is a top view of an embodiment of the landscape application for skimmer and filter unit of FIG. 19.
Figure 20B:
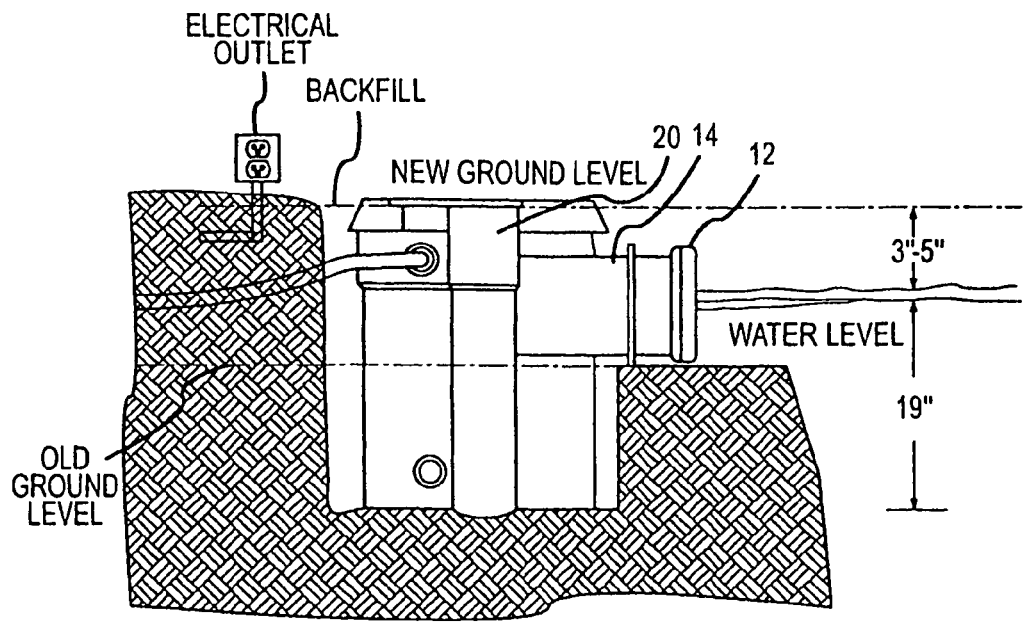

FIG. 20a provides a top view of the landscape application for skimmer and filter unit 10 and FIG. 20b provides a side view for the landscape application of FIG. 19. Preferably skimmer and filter unit 10 is positioned so that the bottom surface of housing 20 is approximately nineteen inches below the intended water level and the bottom surface of neck 14 is approximately seven inches below the intended water level, leaving approximately three to five inches between the water level and the ground level surface created by backfilling around skimmer and filter unit 10.

Figure 21:
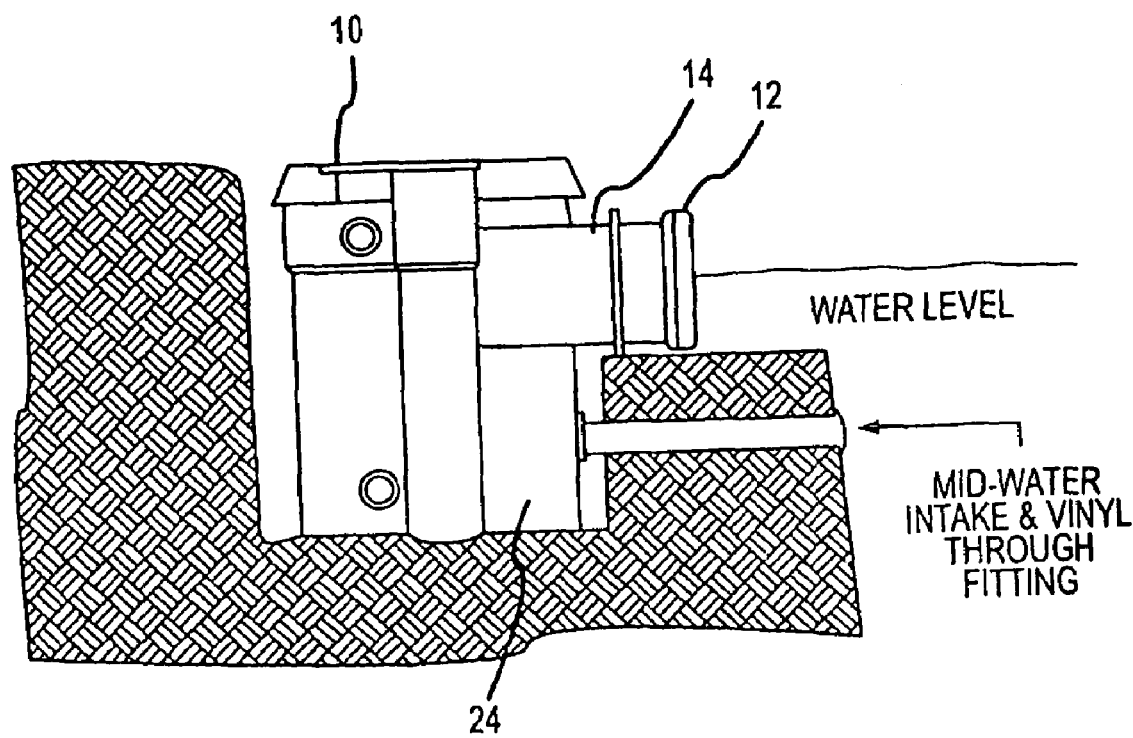
FIG. 21 is a side view of an embodiment of the mid-water intake feature of the skimmer and filter.

Referring to FIG. 21, a side view of an optional mid-water intake to skimmer and filter unit 10 is shown. A mid-water intake aids in preventing wear on the pump if the water level falls below the level of the weir of skimmer faceplate assembly 12. Further, in cold-weather applications when ice forms at the water surface, weir door 18 (See FIGS. 8 and 9) can be closed via locking tab 22 and water can be drawn from beneath the surface of the ice through the mid-water intake directly into skimmer chamber 24.

Although the invention has been described in detail with particular reference to these embodiments, other embodiments can achieve the same results. Variations and modifications of the present invention will be obvious to those skilled in the art and it is intended to cover all such modifications and equivalents. The entire disclosures of all references, applications, patents, and publications cited above are hereby incorporated by reference.

The invention claimed is:

1. A surface skimmer and filter unit for use with a body of water comprising:
 a housing;
 a surface water flow intake structure comprising an opening for receiving water from the body of water;
 a collection basket within said housing; and
 a microorganism eradication system comprising a UV light system disposed within said housing.

2. The unit of claim 1 further comprising a filter within said housing for removing contaminants from water received in said housing.

3. The unit of claim 1 further comprising a filter chamber within said housing for removing contaminants from water received in said housing.

4. The unit of claim 1, said housing comprising a generally upright tank.

5. The unit of claim 1, said water flow intake structure comprising a neck.

6. The unit of claim 1, said water flow intake structure comprising a weir faceplate assembly.

7. The unit of claim 6, wherein said weir faceplate assembly comprises a a weir faceplate of variably adjustable dimensions.

8. The unit of claim 1 further comprising a pump within said housing.

9. The unit of claim 1 further comprising a lid mating to said housing for reducing deformation of said housing.

10. The unit of claim 9 wherein said lid comprises an interlocking lid with said housing.

11. The water skimmer of claim 1 further comprising a baffle partitioning said skimmer chamber from a remainder area within said housing, said baffle comprising a midpoint at approximately halfway along its height and at least one upper opening in said baffle disposed above said midpoint of said baffle for allowing water to pass from said skimmer chamber to said remainder area.

12. A method of treating water from a body of water comprising:
   skimming surface water by passing it through an opening disposed in an upper portion of a skimmer housing wherein a skimmer basket is located downstream and approximately beneath the opening; and
   directing skimmed water to a microorganism eradication system which comprises a UV light system within the housing to subject the water to the microorganism eradication system for treatment.

13. The method of claim 12 further of comprising directing the water through a filter chamber within the housing.

14. A surface skimmer and filter unit for use with a body of water comprising:
   a housing;
   a surface water flow intake structure comprising an opening for receiving water from the body of water;
   a collection basket within said housing;
   a variably adjustable weir faceplate; and
   a microorganism eradication system within said housing.

15. The unit of claim 14 further comprising a filter within said housing for removing contaminants from water received in said housing.

16. The unit of claim 14 further comprising a filter chamber within said housing for removing contaminants from water received in said housing.

17. The unit of claim 14 further comprising a lid mating to said housing for reducing deformation of said housing.

18. The unit of claim 14 further comprising a lid mating to said housing for reducing deformation of said housing.

19. The unit of claim 18 wherein said lid comprises an interlocking lid with said housing.

20. The unit of claim 14 said housing comprising a generally upright tank.

21. The unit of claim 14 said water flow intake structure comprising a neck.

22. The unit of claim 14 further comprising a pump within said housing.

23. The water skimmer of claim 14 further comprising a baffle partitioning said skimmer chamber from a remainder area within said housing, said baffle comprising a midpoint at approximately halfway along its height and at least one upper opening in said baffle disposed above said midpoint of said baffle for allowing water to pass from said skimmer chamber to said remainder area.

24. A method of treating water from a body of water comprising:
   skimming surface water by passing it through an adjustable weir faceplate assembly comprising an opening and into a skimmer housing wherein a skimmer basket is located downstream and approximately beneath the opening; and
   directing skimmed water to a microorganism eradication system for treatment.

25. The method of claim 24 further of comprising directing the water through a filter chamber within the housing.

26. A surface skimmer and filter unit for use with a body of water comprising:
   a housing comprising a skimmer chamber;
   a surface water flow intake structure comprising an opening for receiving water from the body of water;
   a collection basket within said housing;
   a microorganism eradication system within said housing; and
   a baffle partitioning said skimmer chamber from a remainder area within said housing, said baffle comprising a midpoint at approximately halfway along its height and at least one upper opening in said baffle disposed above said midpoint of said baffle for allowing water to pass from said skimmer chamber to said remainder area.

* * * * *